(12) United States Patent
Phan et al.

(10) Patent No.: US 7,833,611 B2
(45) Date of Patent: Nov. 16, 2010

(54) OLEFIN BASED COMPOSITIONS AND FLOOR COVERINGS CONTAINING THE SAME

(75) Inventors: Tam Thi Minh Phan, Bear, DE (US); Hao Chen, Chadds Ford, PA (US); Dennis H. Bradway, Salem, NJ (US)

(73) Assignee: Mannington Mills, Inc., Salem, NJ (US)

( * ) Notice: Subject to any disclaimer, the term of this patent is extended or adjusted under 35 U.S.C. 154(b) by 215 days.

(21) Appl. No.: 11/710,047

(22) Filed: Feb. 23, 2007

(65) Prior Publication Data

US 2008/0206583 A1    Aug. 28, 2008

(51) Int. Cl.
*B32B 27/18* (2006.01)
*B32B 27/32* (2006.01)
*C08L 23/04* (2006.01)
*C08L 23/10* (2006.01)
*C08L 23/12* (2006.01)
*C08L 51/06* (2006.01)

(52) U.S. Cl. .................... 428/195.1; 428/206; 428/522; 428/523; 525/240; 525/242; 524/515; 264/211.21

(58) Field of Classification Search ................ 428/204, 428/195.1, 523, 522, 206; 524/445, 451; 525/240, 242; 264/211.21
See application file for complete search history.

(56) References Cited

U.S. PATENT DOCUMENTS

| | | | |
|---|---|---|---|
| 4,508,872 A | 4/1985 | McCullough, Jr. | |
| 5,735,990 A * | 4/1998 | Shikano et al. | 156/244.11 |
| 5,773,515 A * | 6/1998 | Srinivasan et al. | 525/240 |
| 5,804,304 A | 9/1998 | Williams et al. | |
| 5,824,727 A | 10/1998 | Blomkvist et al. | |
| 5,945,472 A | 8/1999 | Duong et al. | |
| 6,187,424 B1 * | 2/2001 | Kjellqvist et al. | 428/220 |
| 6,214,924 B1 | 4/2001 | Bieser et al. | |
| 6,254,956 B1 | 7/2001 | Kjellqvist et al. | |
| 6,380,296 B1 * | 4/2002 | Inada | 524/445 |
| 6,951,900 B2 | 10/2005 | Blanchard et al. | |
| 6,986,934 B2 | 1/2006 | Chen et al. | |
| 2002/0142135 A1 * | 10/2002 | Chen et al. | 428/143 |
| 2002/0161139 A1 * | 10/2002 | Blackmon et al. | 526/90 |
| 2003/0087981 A1 * | 5/2003 | Hamrock et al. | 522/46 |
| 2005/0048277 A1 | 3/2005 | Oshilaja et al. | |
| 2005/0192385 A1 * | 9/2005 | Zingg et al. | 524/100 |
| 2007/0021566 A1 | 1/2007 | Tse et al. | |

FOREIGN PATENT DOCUMENTS

EP    0861951 A2    9/1998

OTHER PUBLICATIONS

Basell Polyolefins Metocene MF650X Product Data Sheet (2003).*
International Search Report and the Written Opinion of the International Searching Authority for corresponding International Patent Application No. PCT/US2008/054687 dated Jun. 27, 2008.

* cited by examiner

*Primary Examiner*—Patricia L Nordmeyer
*Assistant Examiner*—Prashant J Khatri
(74) *Attorney, Agent, or Firm*—Kilyk & Bowersox, P.L.L.C.

(57) ABSTRACT

A composition is described that includes at least one compatibilizer having at least one polyolefin and at least one polar group. The composition can include a blend of polymers. Surface coverings and floor coverings, such as laminated floor coverings, having the composition, are also described.

44 Claims, 11 Drawing Sheets

Table 1

| Sample | Control Formula 1 | 1A | 2A | 3A |
|---|---|---|---|---|
| Materials, in w% | | | | |
| Ethylene Propylene copolymer, MFR <1.0 g/10 min.@ 230oC & 2.16 Kg) | 18 | 17 | 17 | 17 |
| MAH-g-PP (1% MAH, MFR =115 g/10 min. @t 190oC & 2.16 Kg) | | | | 1 |
| Polypropylene homopolymer, MFR=1950 g/10 min. @230oC & 2.16 kg | | 1 | 1 | |
| Strukol ™TR-065 - aromatic & aliphatic HC modified with acid | | | | |
| 50 top mesh size Dolomitic Limestone, Calcium-Magnesium carbonate, untreated | 82 | 82 | 82 | 82 |
| Total | 100 | 100 | 100 | 100 |
| Performance Properties | | | | |
| Static load Indentation @ 750 psi; 1/1000" of indent depth | 3 | 2 | 2 | 2 |
| Note of visual after indentation: break or crack | No crack | No crack | Slight crack | No crack |
| Static load Indentation @ 2000 psi; 1/1000" of indent depth | 17 | 7 | 10 | 3.5 |
| Note of visual after indentation: break or crack | Severe cracks | cracks | severe cracks | No crack |
| Impact - Small ball impact test, 1" ball dia., Height: 20", W= 65 grs.) | Cracked < 3" | Cracked < 3" | Cracked < 3" | No cracks |
| Fail if cracks propagated beyond 3"circles (a total of 8 drops) | No failure | No failure | No failure | No failure |
| Elongation @break (cross head speed 2"/min.) | 2.73 | 2.4 | 1.6 | 19.7 |
| Tensile strength @ break (2"/min.) | 596 | 787 | 723 | 1297 |
| Tensile Modulus (cross head speed 2"/min.) | 57897 | 62572 | 75940 | 71675 |
| Indent (1 min. w/ 30 lbs.) (cone foot) - 1/1000" of indent depth | 14.5 | 15 | 12.5 | 10 |
| Abrasion (Taber abrader), thickness loss, 1/1000" | 15 | 12 | 16 | 8 |
| Abrasion (Taber abrader) weight loss, grs. | 2.4 | 1.8 | 2.5 | 1.2 |
| Deflection, report inches of deflection | 0.8 | 1.19 | 0.7 | 1.78 |
| Brabender Plastogram - Mixing Torque, Time and Temperature | | | | |
| Minimum Flux Time (seconds) | 232 | 86 | 212 | 100 |
| Minimum Flux Torque (Nm) | 34.5 | 27.2 | 34.4 | 40.6 |
| Stock Temp.°(F) | 393 | 373 | 383 | 370 |

FIG. 1

Table 2

FIG. 2

| Sample | 1B | 2B | 3B | 4B | 5B |
|---|---|---|---|---|---|
| Materials, in w% | | | | | |
| Ethylene Propylene copolymer, MFR <1.0 g/10 min.@ 230oC & 2.16 Kg) | 16 | 16 | 16 | 15 | 12 |
| MAH-g-PP (1% MAH, MFR =115 g/10 min. @ 190oC & 2.16 Kg) | 1 | 1 | 1 | 1 | 1 |
| Polypropylene homopolymer, MFR=1950 g/10 min. @230oC & 2.16 kg | | | | | 1 |
| Strukol ™ TR-065 – aromatic & aliphatic HC modified with acid | 1 | 1 | 1 | 1 | 1 |
| 50 top mesh size Dolomitic Limestone, Calcium-Magnesium carbonate | 82 | 82 | 82 | 82 | 85 |
| Total | 100 | 100 | 100 | 100 | 100 |
| Performance Properties | | | | | |
| Static load Indentation @ 750 psi; 1/1000" of indent depth | 2 | 3 | 2 | 2 | 1.5 |
| Note of visual after indentation: break or crack | No crack | No crack | No crack | No crack | No crack |
| Static load Indentation @ 2000 psi; 1/1000" of indent depth | 3.5 | 7 | 4 | 3 | 2 |
| Note of visual after indentation: break or crack | No crack | Cracks | No crack | No crack | No crack |
| Impact - Small ball impact test, 1" ball dia., Height: 20", W= 65 grs.) | No crack | Cracked < 3" | No crack | No cracks | No cracks |
| Fail if cracks propagated beyond 3" circles ( a total of 8 drops) | No failure | No failure | No failure | No failure | No failure |
| Elongation @break (cross head speed 2"/min.) | 18.1 | 1.8 | 24.5 | 14.6 | 17.8 |
| Tensile strength @ break (2"/min.) | 1439 | 879 | 1314 | 1415 | 1463 |
| Tensile Modulus (cross head speed 2"/min.) | 87086 | 80118 | 86875 | 80424 | 82831 |
| Indent  (1 min. w/ 30 lbs.) (cone foot) - 1/1000" of indent depth | 9 | 13 | 10 | 9.5 | 6.5 |
| Abrasion (Taber abrader), thickness loss, 1/1000" | 9 | 13 | 9 | 10 | 10 |
| Abrasion (Taber abrader) weight loss, grs. | 1.3 | 2.1 | 1.3 | 1.3 | 1.4 |
| Deflection, report inches of deflection | 1.0 | 0.8 | 1.8 | 1.8 | 1.72 |
| Brabender Plastogram - Mixing Torque, Time and Temperature | | | | | |
| Minimum Flux Time (seconds) | 118 | 194 | 174 | 130 | 92 |
| Minimum Flux Torque (Nm) | 41.7 | 28.8 | 32.8 | 31.6 | 26.3 |
| Stock Temp.°(F) | 376 | 381 | 389 | 385 | 371 |

Table 3

FIG. 3

| Sample | Control Formula 2 | 1C | 2C | 3C |
|---|---|---|---|---|
| Materials, in w% | | | | |
| Polypropylene homopolymer, MFR =12 g/10 min.@230oC &2.16 Kg, | 3 | 3 | 3 | 3 |
| MAH-g-PP (1% MAH, MFR=115 g/10min. @190oC & 2.16 Kg. | | 1 | | |
| Polypropylene homopolymer, MFR=1950 g/10 min. @230oC & 2.16 kg. | | | | 1 |
| Strukol ™TR-065 – aromatic & aliphatic HC modified with acid | | | 1 | |
| Ethylene Propylene copolymer , MFR <1.0 g/10 min.@ 230oC & 2.16 Kg) | 12 | 11 | 11 | 11 |
| 50 top mesh size Dolomitic Limestone, Calcium-Magnesium carbonate, | 85 | 85 | 85 | 85 |
| Total | 100 | 100 | 100 | 100 |
| Performance Properties | | | | |
| Static load Indentation @ 2000 psi; mil or 1/1000" of indent depth | 5 | 3 | 3 | 3 |
| Note of visual after indentation: break or crack | Hair line crack | No crack | Cracks | No crack |
| Impact - Small ball impact test , 1" ball dia., Height: 20", W= 65 grs.) | Cracked <3" | Cracked <3" | No crack | No crack |
| Fail if cracks propagated beyond 3"circles ( a total of 8 drops) | No failure | No failure | No failure | No failure |
| Elongation @break (cross head speed 2"/min.) | 1.23 | 1.1 | 1.2 | 4.2 |
| Tensile strength @ break (2"/min.) | 434 | 529 | 627 | 890 |
| Tensile Modulus (cross head speed 2"/min.) | 51038 | 85175 | 76007 | 71588 |
| Indent (1 min. w/ 30 lbs.) (cone foot) - 1/1000" of indent depth | 9 | 9 | 10 | 6 |
| Abrasion (Taber abrader), thickness loss, 1/1000" | 11 | 8 | 11 | 7 |
| Abrasion (Taber abrader) weight loss, grs. | 1.76 | 1.3 | 1.59 | 1.02 |

Table 4

FIG. 4

| Sample | Control Formula 3 | 1D | 2D | 3D | Control Formula 4 |
|---|---|---|---|---|---|
| Materials, in w% | | | | | |
| Polypropylene homopolymer, MFR =12 g/10 min.@230oC &2.16 Kg, | 3 | 3 | 3 | 3 | PVC |
| MAH-g-PP (1% MAH, MFR=115 g/10min. @190oC & 2.16 Kg. | | 1 | 1 | 1 | |
| Polypropylene homopolymer, MFR=1950 g/10 min. @230oC & 2.16 kg. | | 1 | 1 | 1 | consisted of |
| Strukol TR-065 - aromatic & aliphatic HC modified with acid | | | 1 | | PVC, plasticizer |
| Ethylene Propylene copolymer, MFR <1.0 g/10 min.@ 230oC & 2.16 Kg) | 12 | 10 | 10 | 9 | Heat stabilizer |
| 50 top mesh size Dolomitic Limestone, Calcium-Magnesium carbonate, untreated | 85 | 85 | 85 | 85 | 85% limestone |
| Total | 100 | 100 | 100 | 100 | |
| Performance Properties | | | | | |
| Static load Indentation @ 2000 psi; mil or 1/1000" of indent depth | 5 | 2 | 4 | 2 | 2 |
| Note of visual after indentation: break or crack | Hair line crack | No crack | No crack | No crack | No crack |
| Impact - Small ball impact test, 1" ball dia, Height: 20", W= 65 grs.) | Cracked < 3" | No crack | No crack | No crack | Some cracked > 3" |
| Fail if cracks propagated beyond 3"circles ( a total of 8 drops) | No failure | No failure | No failure | No failure | 50/50 pass/ Fail |
| Elongation @break (cross head speed 2"/min.) | 1.23 | 3.7 | 4.9 | 4.9 | 2 |
| Tensile strength @ break (2"/min.) | 434 | 1114 | 1083 | 1441 | 1076 |
| Tensile Modulus (cross head speed 2"/min.) | 51038 | 87175 | 79776 | 96703 | 88447 |
| Indent (1 min. w/ 30 lbs.) (cone foot) - 1/1000" of indent depth | 9 | 4.5 | 6 | 4 | 7 |
| Abrasion (Taber abrader), thickness loss, 1/1000" | 11 | 7 | 7.5 | 5 | 9 |
| Abrasion (Taber abrader) weight loss, grs. | 1.76 | 1.1 | 0.84 | 0.84 | 1.4 |

Table 5

| Sample | 1E | 2E | 3E | 4E |
|---|---|---|---|---|
| Materials, in w% | | | | |
| Ethylene Propylene copolymer, MFR <1.0 g/10 min.@ 230oC & 2.16 Kg) | 12 | 12 | 12 | 12 |
| MAH-g-PP (1.2% MAH, MFR=400 g/10min. @190oC & 2.16 Kg.) | 1 | 1 | 1 | 1 |
| Polypropylene homopolymer, MFR=1950 g/10 min. @230oC & 2.16 kg. | | 1 | | |
| Strukol™TR-065 – aromatic & aliphatic HC modified with acid | 1 | | | |
| Escorez™ 1310LC: an aliphatic HC | | | | |
| Escorex™ 2596 an aromatically-modified aliphatic HC | | | 1 | 1 |
| PP hompolymer - Metalocene, MFR = 1800 g/10 min. at 230oC & 2.16 Kg) | | | | |
| 50 top mesh size Dolomitic Limestone, Calcium-Magnesium carbonate, untreated | 85 | 85 | 85 | 85 |
| Total | 100 | 100 | 100 | 100 |
| Note from 2-roll Mills (filler incorporation) & sheet forming | Filler incorporated well. Very good tack and sheet forming with in 2 min. | Slightly longer to incorporate filler than Ex. 1. Sheet forming time ~3 min. | Slightly better than Ex. 2. Ex. 1 is the best in sheet tack and form than Ex. 2 & Ex. 3. | Filler incorporated & sheet formation very good, similar to Ex. 1. |
| Performance Properties | | | | |
| Static load Indentation @ 750 psi; 1/1000" of indent depth | 1.5 | 2 | 1 | 2 |
| Note of visual after indentation: break or crack | no cracks | no cracks | no cracks | no cracks |
| Static load Indentation @ 2000 psi; 1/1000" of indent depth | 2.5 | 3 | 3 | 3 |
| Note of visual after indentation: break or crack | no cracks | no cracks | no cracks | no cracks |
| Impact - Small ball impact test, 1" ball dia, Height: 20", W= 65 grs.) | pass | pass | pass | pass |
| Fail if cracks propagated beyond 3"circles ( a total of 8 drops) | no cracks | no cracks | no cracks | no cracks |
| Elongation @break (cross head speed 2"/min.) | 16 | 20 | 22 | 22 |
| Tensile strength @ break (2"/min.) | 1374 | 1402 | 1425 | 1453 |
| Tensile Modulus (cross head speed 2"/min.) | 82659 | 76358 | 69799 | 77526 |
| Indent (1 min. w/ 30 lbs.) (cone foot) - 1/1000" of indent depth | 7.5 | 7 | 7.5 | 7 |
| Abrasion (Taber abrader), thickness loss, 1/1000" | 10 | 10 | 10 | 10 |
| Abrasion (Taber abrader) weight loss, grs. | 1.4 | 1.47 | 1.59 | 1.51 |
| Deflection (Inch.) | 1.7 | 1.2 | 1.54 | 1.1 |

Table 6

| Sample | 1F | | Control Formula 5 | |
|---|---|---|---|---|
| Materials, in w% | | | | |
| Ethylene Propylene copolymer, MFR <1.0 g/10 min.@ 230oC & 2.16 Kg) | 9 | | | consisted of |
| MAH-g-PP (1.2% MAH, MFR=400 g/10min. @190oC & 2.16 Kg.) | 1 | | | PVC, plasticizer |
| Polypropylene homopolymer, MFR=1950 g/10 min. @230oC & 2.16 kg. | 1 | | | heat stabilizer |
| Polypropylene homopolymer, MFR =12 g/10 min.@230oC &2.16 Kg, | 3 | | | |
| Strukol ™TR-065 – aromatic & aliphatic HC modified with acid | 1 | | | |
| Post consumer glass bead at 200 mesh particle sizes from Dlubak | 10 | | | no post consumer |
| Post consumer glass bead at 325 mesh particle sizes from Dlubak | 5 | | | Waste |
| Calcium carbonate, coarse particles (DP-5025), 50 mesh top | 70 | | | 82% limestone |
| Total | 100 | | | |
| Pigment | | | | |
| Titanium Oxide (White pigment) (w% base on total batch weight) | 3 | | | total ~ 3 w% |
| Total w % of inorganic filler | 88 | | | 85 |
| Physical Properties | | | | |
| Weight (lb./sq. yard for thickness at ~ 0.120") | 10.91 | | | 12.77 |
| Static load Indentation @ 2000 psi; 1/1000" of indent depth | 2 | | | 2 |
| Note of visual after indentation: break or crack | no cracks | | | no cracks |
| Impact - Small ball impact test, 1" ball dia., Height: 20", W= 65 grs.) | no cracks | | | crack w/in 3" |
| Fail if cracks propagated beyond 3"circles ( a total of 8 drops) | Pass / no cracks | | | Pass w/ crack w/in 3" |
| Elongation @break (cross head speed 2"/min.) | 2.3 | | | 2 |
| Tensile strength @ break (2"/min.) | 1398 | | | 933 |
| Tensile Modulus (cross head speed 2"/min.) | 116934 | | | 91129 |
| Indent (1 min. w/ 30 lbs.) (cone foot) - 1/1000" of indent depth | 5 | | | 7 |
| Abrasion (Taber abrader), thickness loss, 1/1000" | 7.8 | | | 11 |
| Abrasion (Taber abrader) weight loss, grs. | 0.98 | | | 1.71 |

FIG. 7

Table 7

| Stains Agents | 1G* | Control Formula 6* |
|---|---|---|
| Methylene blue | 1 | 2 |
| Betadine | 1 | 2 |
| Bleach | 0 | 0 |
| Phenolic disinfectant | 0 | 0 |
| Lugals solution | 1 | 2 |
| Giesma blood | 1 | 2 |
| K-permanganate | 2 | 3 |
| Quartinary disinfectant (toilet bowl cleaner) | 0 | 0 |
| Kiwi Brown shoe polish | 3 | 3 |
| Oil brown solution dye (2% oil brown in miniral spirit) | 3 | 3 |
| Iodine | 2 | 2 |
| Chem lawn liquid fertilizer | 1 | 0 |
| Driveway sealer (KC 261) (Kopper company) | 1 | 3 |
| Sharpie Blue | 2 | 2 |
| TOTAL (Summation of numerical stain rating) | 18 | 24 |

* No wax applied. Stain (0=none, 1=light, 2=moderate, 3=heavy) - 2 hrs. contact, cleaned and visual rating. Test method adapted from ASTM F925-02 & Mannington test method M042. Odorless Mineral Spirit oil (OMS) was used to clean KC-261, oil brown and shoe polish because they are oil base stains. All other stains used neutral pH cleaner.

Table 8

FIG. 8

| Heat & Light Stability | 1H* | Control Formula 7** |
|---|---|---|
| Heat Stability (ASTM F 1514-03 and Mannington Method M232) | | |
| Low heat @ 150oF for 3 weeks (Delta E) | 0.41 | 1.13 |
| Light Stability (ASTM F1515-03 and Mannington Method M232) | | |
| Weatherometer, Xenon @ 400 hours (Plus exposed at 150oF for 4 hrs.) (Delta E) | 3.52 | 43.5 |
| Indoor Light (Mannington Method M232) | | |
| HPUV (simulated indoor fluorescent light) for 2 weeks, plus exposed at 150oF for 4 hrs., (Delta E) | 0.06 | 11.96 |

\* No UV stabilizer added. Contained only 0.045 w% of heat stabilizer
\*\* Contained 0.5 w% of heat stabilizer
Reading of Delta E obtained from colorimeter ACS Table 9

FIG. 9

| Sample* | 1I[1] | 2I[2] | 3I[3] | 4I[4] |
|---|---|---|---|---|
| Number of coats applied | 3 coats | 3 coats | 3 coats | 3 coats |
| % Adhesion tested by ASTM D 3359-02 *** | 98% pass | 100% pass | 95% pass | 90% pass |

\*Color tile made from chip consolidation
\*\* These waxes are typical waxes used in PVC tile
\*\*\* ASTM D3359-02 & Mannington method M174 – ¾" wide Scotch 3M # 810 tape Trade name of Commercial Wax \*\*
1: 25 GRAND™
2: Johnson SIGNATURE™
3: Ecolab GEMSTAR STRATUS™
4: TASKI PRIMER™ & TASKI WAX™

FIG. 10

Table 10

| Sample | 1J |
|---|---|
| Materials, in w% | |
| Ethylene Propylene copolymer, MFR <1.0 g/10 min.@ 230oC & 2.16 Kg) | 6 |
| MAH-g-PP (1.2% MAH, MFR=400 g/10min. @190oC & 2.16 Kg.) | 1 |
| Polypropylene homopolymer, MFR=1950 g/10 min. @230oC & 2.16 kg. | 1 |
| Strukol TR-065 - aromatic & aliphatic HC modified w/ acid | |
| Ionomer of ethylene and acrylic acid, neutralized with salts, e.g. sodium grade | 6 |
| 50 top mesh size Dolomitic Limestone, Calcium-Magnesium carbonate, untreated | 85 |
| Total | 100 |
| Processing: 2 -roll mill | |
| 2-Roll mill temperature (degrees F) | 370 |
| Melt, Mixing and sheet forming time, min. | 2 min. |
| Note from 2-roll Mills (filler incorporation & sheet forming) | filler wet out & sheet formed with good tack |
| Performance Properties | |
| Static load Indentation @ 750 psi; 1/1000" of indent depth | 3 |
| Note of visual after indentation: break or crack | no cracks |
| Static load Indentation @ 2000 psi; 1/1000" of indent depth | 3 |
| Note of visual after indentation: break or crack | no cracks |
| Impact - Small ball impact test, 1" ball dia., Height: 20", W= 65 grs.) | |
| Fail if cracks propagated beyond 3"circles ( a total of 8 drops) | pass |
| Elongation @break (cross head speed 2"/min.) | 4 |
| Tensile strength @ break (2"/min.) | 1472 |
| Tensile Modulus (cross head speed 2"/min.) | 103348 |
| Indent (1 min. w/ 30 lbs.) (cone foot) - 1/1000" of indent depth | 5 |
| Abrasion (Taber abrader), thickness loss, 1/1000" | 9 |
| Abrasion (Taber abrader) weight loss, grs. | 1.19 |

FIG. 11

Table 11

| Stains Agents | Sample 1K | Comparison Sample A |
|---|---|---|
| Methylene blue | 0 | 1 |
| Betadine | 0 | 0 |
| Bleach | 0 | 0 |
| Sharpie blue | 0 | 2 |
| Lugols solution | 0 | 0 |
| Giesma blood | 0 | 0 |
| K-permanganate | 1 | 3 |
| Quartinary disinfectant (toilet bowl cleaner) | 0 | 0 |
| Kiwi Brown shoe polish | 0 | 2 |
| Oil brown solution dye (2% oil brown in miniral spirit) | 0 | 2 |
| Iodine | 1 | 2 |
| Chem lawn liquid fertilizer | 0 | 0 |
| Driveway sealer (KC 261) (Kopper company) | 0 | 1 |
| TOTAL (Summation of all numerical stain rating) | 2 | 13 |
| Scratch Resistance Property | | |
| Taber Scratch (grams or load when scratch occurred) - Mannington Method M167 – higher load is better scratch resistance | 210 | 200 |
| Abrasion (Taber abrader), thickness loss, 1/1000" | 4 | 20 |
| Abrasion (Taber abrader), cycles - NALFA - LF01-2003, 3.7 | >4000 | >4000 |

Stain (0=none, 1=light, 2=moderate, 3=heavy) - 2 hrs. contact, cleaned and visual rating. Test method adapted from ASTM F925-02 & Mannington test method M042. Odorless Mineral Spirit oil (OMS) was used to clean KC-261, oil brown and shoe polish because they are oil base stains. All other stains used neutral pH cleaner

FIG. 12

Table 12

| Sample | 1L | 2L | 3L |
|---|---|---|---|
| Materials, in w% | | | |
| Ethylene Propylene copolymer, MFR <1.0 g/10 min.@ 230oC & 2.16 Kg) | 12 | 6 | 2.4 |
| MAH-g-PP (1.2% MAH, MFR=400 g/10min. @190oC & 2.16 Kg.) | 1 | 0.5 | 0.2 |
| Polypropylene homopolymer, MFR=1950 g/10 min. @230oC & 2.16 kg. | 1 | 0.5 | 0.2 |
| Strukol TR-065 - aromatic & aliphatic HC modified w/ acid | 1 | 0.5 | 0.2 |
| Post consumer glass bead at 200 mesh particle sizes from Dlubak | 10 | 5 | 2 |
| Post consumer glass bead at 325 mesh particle sizes from Dlubak | 5 | 2.5 | 1 |
| Calcium carbonate, coarse particles (DP-5025), 50 mesh top | 69 | 34.5 | 13.8 |
| Titanium Oxide (White pigment) | 1 | 0.5 | 0.2 |
| Post consumer material (made from 1L) | | 50 | 80 |
| Total | 100 | 100 | 100 |
| Physical Properties | | | |
| Impact - Small ball impact test, 1" ball dia., Height: 20", W= 65 grs.) | no cracks | no cracks | no cracks |
| Elongation @break (cross head speed 2"/min.) | 4.7 | 4.3 | 4.1 |
| Tensile strength @ break (2"/min.) | 1065 | 1032 | 1038 |
| Deflection (Inch.) | 2 | 1.8 | 1.9 |

OLEFIN BASED COMPOSITIONS AND FLOOR COVERINGS CONTAINING THE SAME

BACKGROUND OF THE INVENTION

The present invention relates to olefin based compositions. In particular, the present invention relates to compositions comprising at least one polyolefin modified or functionalized by at least one polar group and one or more polyolefins, and optionally, to halogen-free forms of such compositions. The present invention further relates to floor coverings and laminated surface coverings containing an olefin based composition of the present invention, such as halogenated-free surface coverings containing such a composition, and to methods of making the compositions, flooring coverings, and laminated surface coverings.

Polyolefins have been used for a surface covering. Conventional polyolefins were found to mix poorly with fillers, particularly when the filler loading is greater than 50 wt % of the compositions. As a result, the costs of polyolefin products were not competitive with PVC products. Moreover, the adhesion of the polyolefin to other components can be poor.

Accordingly, there is a need to provide a non-PVC composition for surface coverings, such as a floor covering.

Further, there is a need to provide an olefin based composition that can be processed into a floor covering product at a lower life cycle (LLC) cost.

Further, there is a need to provide a composition for a floor covering that is environmentally friendly, such as one that is non-halogenated and does not contain a plasticizer.

Further, there is a need to provide a floor covering that has a better performance than conventional PVC or polyolefin surface coverings, such as higher strength, better impact resistance, better stain resistance, better resistance to high static load, and low maintenance, such as eliminating or decreasing the need for applying a finish, while overcoming all of the disadvantages as described above.

SUMMARY OF THE INVENTION

A feature of the present invention is to provide a non-PVC or otherwise halogen-free composition for a surface covering. In particular, a feature of the present invention is to provide a composition for a floor covering that is environmentally friendly, such as one that is non-halogenated and does not contain a plasticizer or a composition that contains less halogens and/or plasticizers, such as polyvinyl chloride, halogenated compound(s) or phthalate plasticizers as well as heavy metal stabilizers, etc.

Another feature of the present invention is to provide non-halogenated surface and floor coverings that have a better performance than conventional PVC or polyolefin surface coverings, such as better impact resistance, crack resistance, better stain resistance, better resistance to heat and light, better resistance to high static load, or low maintenance, such as eliminating or decreasing the need for applying a finish.

Yet another feature of this invention is providing flooring material that is lighter in weight than a PVC product for the same thickness and filler loading, which will have a positive impact on the product life cycle cost due to the savings in transportation and packaging costs.

An additional feature of this invention is the development of a surface covering product that can be processed into a surface covering by adapting traditional PVC manufacturing processing and equipment without requiring new capital investment for process equipment. Moreover, another feature of the present invention is the provision of an olefin based composition that can be processed into an olefin based composition floor covering at a relatively low cost.

A further feature of this invention is the improvement of the adhesion between non-PVC based flooring materials to sub-flooring by making it feasible to effectively use environmentally-desirable water based adhesive systems.

One more feature of this invention is the development of surface coverings that can be recycled as well as utilize high amounts of post consumer and post industrial waste in the formula to benefit the environment. Another feature of this invention is to produce surface coverings with superior surface properties that allow for a simplified maintenance procedure as well as to reduce the maintenance cost thus resulting in a lower life cycle cost for the product.

Additional features and advantages of the present invention will be set forth in the description which follows, and, in part, will be apparent from the description, or may be learned by practice of the present invention. The features and other advantages of the present invention will be realized and attained by means of the elements and combinations particularly pointed out in the written description and the claims.

To achieve these and other advantages, and in accordance with the purposes of the present invention as embodied and broadly described herein, the present invention relates to a composition comprising a blend containing at least one compatibilizer, such as a polyolefin functionalized or modified with at least one polar group. The composition can further contain a blend of polymers comprising a first polymer and optionally, a second polymer. The first polymer is preferably an ethylene propylene copolymer and the second polymer is preferably a polypropylene homopolymer. The polar group can be a carboxylic group, maleic anhydride, acrylic acid, acrylate, ethylene methacrylic acid, or any combination thereof. The compatibilizer is preferably at least one polypropylene modified and/or functionalized with maleic anhydride, polypropylene modified and/or functionalized with acrylic acid, polyethylene modified and/or functionalized with maleic anhydride, polyethylene modified and/or functionalized with acrylic acid, or any combination thereof. The composition can include at least one tackifier, such as at least one hydrocarbon. Preferred hydrocarbons include aliphatic hydrocarbon, a cycloaliphatic hydrocarbon, an aromatic modified aliphatic hydrocarbon, an aromatic and aliphatic hydrocarbon modified with fatty acid ester, or any combination thereof. For purposes of the present invention, and in all embodiments of the present invention, the hydrocarbons can be any hydrocarbon that is suitable in forming surface coverings, and functions as a tackifier. The composition can also have at least one dispersion agent including at least one ultra high melt flow polypropylene and/or at least one lubricant. The composition can also include at least one filler. The resulting composition is often referred to herein as an olefin based composition.

According to one non-limiting embodiment, an olefin based composition suitable for a backing substrate of a surface covering is provided, comprising: (i) 5 to 45% by weight of an ethylene propylene copolymer; (ii) 0.1 to 20% by weight of a second polyolefin, different from the first polymer, which can be selected from one or more of the following components (a)-(f): a) a polypropylene homopolymer; b) a polypropylene random copolymer, c) a ethylene alpha-olefin copolymers made from "single-site" catalysts such as metallocenes, d) a ethylene acrylate copolymer, e) ethylene acrylate acrylic acid terpolymer, and f) an ionomer of ethylene acrylic acid of metal salts; (iii) 0.1 to 5% by weight of an acid or anhydride functionalized polyolefin as a compatibilizer;

(iv) 0.1 to 5% by weight of a hydrocarbon tackifier; (v) 0.1 to 5% by weight of a polyolefin with ultra-high melt flow as a non-migrating dispersion aid; and (vi) 50 to 90% by weight of inorganic filler or other additives such as flame retardant, antistatic, pigment, antimicrobial, biocide, organic filler, fiber both natural or synthetic, or any combination thereof.

The present invention further relates to a floor covering or laminated surface covering having the olefin based composition of the present invention. In one embodiment, halogenated-free surface coverings are provided of two general types. One type is a homogeneous construction, which is as defined by ASTM F 1066-99 for Through Pattern Tile as the "pattern and colors on the surface of the tile extend entirely through the thickness of the tile without significant change, or the colors appearing on the surface shall extend throughout the entire thickness of the tile, although the appearance of the pattern created by these colors will change through the thickness." The surface covering or flooring articles made with the olefin based composition optionally may also contain a special top coat(s), such as a urethane coating.

The second type is a heterogeneous construction that is defined as multiple distinctively layered sheets in the thickness dimension of the construction. The surface coloring or decorating elements need not extend through the entire thickness of the floor coverings but may be present on one single layer(s) in the construction. In one particular embodiment, a surface covering is provided comprising a polyolefin composition substrate of an embodiment of the present invention with or without the decorative chip elements as applied in either a homogeneous or heterogeneous product. For the heterogeneous product, a printed décor layer is either directly applied or laminated on top of the polyolefin composition base, and, optionally, a highly wear and scratch resistance top coating system is optionally applied directly on the polyolefin composition substrate in the instance of a homogeneous product, or alternatively, on the décor layer of a heterogeneous product including the polyolefin composition substrate.

The present invention also relates to methods of making the compositions, the floor coverings, and the laminated surface coverings, according to the present invention.

In a particular non-limiting embodiment, there is a method of making a laminate surface covering that includes the olefin based composition described herein as a substrate backing for one or multiple coating layers of high scratch and high wear resistance, such as unsaturated functional acrylate coatings that have aluminum oxide particles embedded inside the coating layers. For the heterogeneous product, the coating layers are preferably applied directly on the décor surface of a heterogeneous product and cured by the radiation energy with a sufficient dosage of electron beam or UV light. The décor layer can be created by any conventional means of applying decoration such as printing, painting etc. In printing technology, gravure printing, digital printing or flexo printing can be the choice. The preferred printing substrates are a plastic film or paper. More preferably, the printed visual in the surface covering may be a non-PVC thermoplastic or thermoset which can be selected from the following polymer group: acrylic, cellulosic, polyester, polyurethane, polyolefin, ionomer, etc, or any blends of the above materials. The high scratch and high wear resistance coating(s) and décor layer(s) preferably are laminated by hot melt glue and/or heat bonded on a surface of the olefin based substrate composition. Other attachment techniques known to those in the art can be used.

It is to be understood that both the foregoing general description and the following detailed description are exemplary and explanatory only and are intended to provide a further explanation of the present invention, as claimed.

BRIEF DESCRIPTION OF THE DRAWINGS

FIGS. 1-12 show Tables 1-12, respectively, referenced in Examples 1-9 and 11-13 as set forth in the detailed description provided hereinafter.

DETAILED DESCRIPTION OF THE PRESENT INVENTION

In one aspect, the present invention relates to a composition, and, particularly, an olefin based composition, that includes at least one compatibilizer, which is useful in surface covering and flooring constructions.

The term "olefin based composition" refers to an olefin-containing composition suitable for forming a base, substrate, or backing of a laminate, although that application of the formulation is not necessarily required. The compatibilizer comprises at least one polyolefin having at least one polar group. The term "compatibilizer" is referred to herein as an additive that, when added to a blend of immiscible polymers, modifies their interfaces and/or stabilizes the blend. The compatibilizer, therefore, can permit or improve the adhesion between dissimilar compositions and/or layers of materials. The term "functionalized" is referred to herein as having at least one functional group. For example, "functionalized polymer" is meant that the polymer is reacted with a functional group, and optionally, a catalyst, heat, initiator, or free radical source, to cause all or part of the functional group to incorporate, graft, bond to, physically attach to, and/or chemically attach to the polymer or other polymers. In addition, if a polymer, such as a polyolefin, is "modified or functionalized," it can either have at least one functional group attached by any method as described above, and/or it is a polymer that is directly polymerized from monomers (or produced by using an initiator and/or radical having a functional group) where the polymer has a functional group at a chain end. Therefore, the polyolefin that has a polar group modified and/or functionalized according to the present invention, is a polyolefin that can be produced, for example, by radical induced and reactive extrusion.

A "tackifier," as referred to herein and unless defined differently in context, is a substance, when added to resins, improves the initial and extended adhesion range of one or more substances. This component can be particularly important for enhancing the processability such as calendaring.

In one aspect, the present invention relates to an olefin based composition comprising a) at least one first polymer and optionally, at least one second polymer; b) at least one polyolefin modified or functionalized with at least one polar group; c) optionally, at least one tackifier comprising at least one hydrocarbon, wherein the hydrocarbon comprises an aliphatic hydrocarbon, a cycloaliphatic hydrocarbon, an aromatic modified aliphatic hydrocarbon, an aromatic and aliphatic hydrocarbon modified with fatty acid ester, or any combination thereof; d) optionally, at least one dispersion agent comprising at least one ultra high melt flow polypropylene and/or at least one lubricant; and e) optionally, at least one filler. As an option, the composition of the present invention can be totally halogen-free, meaning no halogen is present in the composition itself. In one or more embodiments of the present invention, one or more or all of the components in the composition can be halogen-free. Thus, as an option, the first polymer can be halogen-free, the second polymer can be halogen-free, the polyolefin modified or functionalized with at least one polar group can be halogen-free, the tackifier, if present, can be halogen-free, and/or the dispersion agent can be halogen-free. As an option, the composition of the present invention can have a low amount of halogens present in the composition, such as 30% by weight (of the composition), or less, such as from about 0.0001 wt % to 30 wt % or from 0.001 wt % to 25 wt %, or from 0.05 wt % to 25 wt %, or from 0.01 wt % to 20 wt %, or from 0.1 wt % to 10 wt %, or from 0.5 wt % to 5 wt %, or from 1 wt % to 5 wt %, or from 0.01 wt % to 1 wt %, or from 0.05 wt % to 1 wt % or any weight percents within these ranges. These weight percents are based on the total halogen content, whether present as elemental halogen or present within one or more of the components forming the composition of the present invention.

First Polymer. The first polymer can be any polymer that can be used in a flooring or surface covering composition. The role of the first polymer is to impart elasticity, impact resistance, and/or good calendaring processability of the composition used in making the olefin backing substrate, although not limited thereto. According to various embodiments, the first polymer can include, but is not limited to, an ethylene propylene copolymer, a Ziegler Natta polyolefin, a metallocene polymer, or any combination thereof. In a particular embodiment, the first component is a polyolefin thermoplastic elastomer where elastomeric properties are obtained through a polymerization process. Preferably, the first polymer is an ethylene propylene copolymer, such as, a $C_2$ and/or $C_3$ copolymer made from a polypropylene homopolymer or random copolymer matrix and a Ziegler Natta catalyst. This ethylene propylene component may be made, e.g., in accordance with processes such as described in U.S. Pat. Nos. 5,302,454; 5,286,564; and 5,212,246, which are incorporated herein by reference. Preferably, the ethylene propylene copolymer has a melt flow rate of from about 0.5 to about 15 g/10 min. at 230° C. and 2.16 Kg according to ASTM D1238. The melting point of the ethylene propylene copolymer generally should be less than 170° C., and preferably is in the range from 140° C. to 160° C., as measured by Differential Scanning Calorimetry (DSC).

More preferably, the ethylene propylene copolymer is a heterophasic polymer produced from a Ziegler Natta polymerization. A preferred heterophasic ethylene propylene copolymer is commercially available from Basell Polyolefin under the trade name SOFTELL™ and ADFLEX™. This ethylene propylene copolymer has a melt flow rate of from about 0.5 to about 12 g/10 min. at 230° C. and 2.16 Kg according to ASTM D1238. It also has an ethylene content of 20 to 50 weight % and a total rubber content of 30 to 70 weight %. This ethylene propylene copolymer has a flex modulus of less than 600 Mpa as measured by ASTM D790, particularly from 50 Mpa to 400 Mpa, and a density of about 0.87 to about 0.90 g/cm$^3$.

The first polymer (e.g., the ethylene propylene copolymer) is preferably present in an amount of from about 10 wt % to about 90 wt %, based on the weight of the composition. More preferably, the first polymer (e.g., the ethylene propylene copolymer) is preferably present in an amount of from about 5 wt % to about 45 wt %, based on the total weight of the composition. Other amounts below and above these ranges can be used.

Second Polymer. The second polymer can be any polymer (e.g., olefin polymer or copolymer) that can be used in a flooring or surface covering composition. The second polymer, when present, is different from the first polymer. The role of second polymer is to further improve surface hardness, wear resistance and indentation recovery of the composition used in making the olefin backing substrate, although not limited thereto. According to at least one embodiment, the second polymer can include, but is not limited to, a polypropylene homopolymer; a polypropylene random copolymer, ethylene alpha-olefin copolymers made from "single-site" catalysts such as metallocenes; a ethylene acrylate copolymer, ethylene acrylate acrylic acid terpolymer, an ionomer of ethylene acrylic acid of metal salts, singly or in any combination thereof.

In order to have good wear, impact, stiffness and indentation recovery properties, the second polymer preferably has a flexural modulus from 20 Mpa to greater than 400 Mpa, and more preferably is from 50 Mpa to 1200 Mpa, as measured by ASTM D790 and a density of from about 0.87 to about 0.97 g/cm$^3$. Preferably, the second polymer is a polypropylene homopolymer As a non-limiting example, such a polypropylene homopolymer can be produced from a Ziegler Natta polymerization and can be obtained from Basell Polyolefin. Preferably, the polypropylene homopolymer has a melt flow rate of from about 5 to about 35 g/10 min. at 230° C. and 2.16 Kg according to ASTM D1238, and/or an isotactic index of at least 85% (e.g., 85% to 100%, 90% to 99%), and/or a density of about 0.90 g/cm$^3$. More preferably, the polypropylene homopolymer has a similar melt flow rate and density, and an isotactic index of at least 95% (e.g., 95% to 99%).

As a non-limiting example, polypropylene homopolymers and random polymers having these properties can be obtained from Basell Corporation, under the tradename PROFAX™, or polymers from Huntsman under product codes: P5L2Z-038 or P4-053 or 12R25A. Ethylene alpha-olefin copolymers having these properties are available under the trade name EXACT™ plastomers from ExxonMobil. Ethylene acrylate copolymers having these properties are available under the trade name ELVALOY AC™ from E.I. DuPont de Nemours. Ethylene acrylate acrylic acid terpolymers having these properties are available under the trade name ESCOR™ EMA-AAA from ExxonMobil. An ionomer of ethylene acrylic acid of metal salts having these properties are available under the trade name SURLYN™ E.I. DuPont de Nemours.

The second polymer (e.g., the polypropylene homopolymer) is preferably present in an amount of from 0.1 wt % to about 20 wt %, based on the total weight of the composition. More preferably, the second polymer (e.g., the polypropylene homopolymer) is preferably present in an amount of from about 1.0 wt % to about 10 wt %, based on the total weight of the composition. Other amounts below and above these ranges can be used.

Compatibilizer. According to various embodiments, the blend contains at least one compatibilizer blended with the first polymer comprising at least one ethylene propylene copolymer and/or the second polymer comprising at least one polypropylene homopolymer. The blend, such as this particular blend, can be present in an amount of from about 5 wt % to about 90 wt %, based on the weight of the composition. The blend, such as this particular blend, can be present in an amount of from about 10 wt % to about 50 wt % or can be present in an amount of from 10% to 50%, based on the total weight of the composition. Other amounts below and above these ranges can be used.

The compatibilizer can be any compatibilizer comprising at least one polyolefin having at least one polar group. The polyolefin can be modified and/or functionalized by the polar group. Preferably, the compatibilizer is one that also acts as a coupling agent or interfacial bonding agent for a polyolefin matrix and filler such that it also provides good tack in a calendaring process. The functionalized polyolefin for the compatibilizer can be any functionalized polyolefin that can be used in a surface or flooring composition.

The polyolefin backbone of this embodiment can be polypropylene, polyethylene, and so forth. Preferably the polyolefin backbone of this embodiment may be a polypropylene homopolymer, a polypropylene random copolymer, or a polypropylene ethylene copolymer. The preferred backbone of the functionalized polypropylene used in this embodiment is an isotactic polypropylene homopolymer, which has an isotactic index of at least 80% (e.g., 80% to 100% or 80% to 99%), more preferably from 85 to 95% or more, as measured by classic hexane index or any modern NMR method. The polar group can be any polar group that can be used to functionalize the polyolefins. The polar group may be obtained, e.g., from unsaturated organic acid anhydrides and/or unsaturated carboxylic acids. The polar group can comprise, but is not limited to, a carboxylic acid group, maleic anhydride, acrylic acid, acrylate, methacrylate, ethylene methacrylic acid, or any combination thereof. Preferably, the polar group is maleic anhydride or acrylic acid. Preferably the functionalized polyolefin for the compatibilizer according to this embodiment is a polypropylene backbone grafted with maleic anhydride.

The polar group-functionalized polyolefin may be produced, for example, using a radical initiator, and the source of the radical initiator can be peroxides, chemicals, or high energy radiation. Processes for making the polar group-functionalized polyolefin are described, e.g., in U.S. Pat. Nos. 4,548,993; 5,955,547; and 6,046,279 describing maleation of polypropylene by peroxide initiator, and U.S. Pat. No. 5,411,994 describing a graft polyolefin obtained by radiation, which are incorporated herein by reference. The polar group can be present in an amount of from about 0.1 wt % to about 10 wt %, preferably from about 1 wt % to about 6 wt %, based on the weight of the polyolefin of the compatibilizer. Where maleic anhydride is the polar group source, the amount of grafted maleic anhydride onto the polypropylene backbone may range from 0.5 weight % to 6 weight %, and more preferably from 0.9 weight % to 2.0 weight %. Other amounts below and above these ranges can be used. The melt flow rate for the functionalized polyolefin can range from 20 to 500 g/10 min. at 190° C. and 2.16 Kg by ASTM D1238, and more preferably is from 100 to 450 g/10 min.

Examples of suitable commercially available functionalized polyolefins according to this embodiment include POLYBOND™ from Chemtura Corp., or EPOLENE™ from Eastman Corp., EXXELOR™ from ExxonMobil Corp., and FUSABOND™ from E.I. DuPont de Nemours.

Preferably, the compatibilizer is present in an amount of from about 0.1 wt % to about 5 wt %, based on the total weight of the composition. More preferably, the compatibilizer is present in an amount of from about 0.5 wt % to about 2 wt %, based on the total weight of the composition. Other amounts below and above these ranges can be used.

The compatibilizer acts as a coupling agent and compatibilizer for the polyolefin and filler as well for the first and second polymers where the first polymer is non-polar in nature and the second polymer is polar in nature. The functionalized polyolefin provides good filler/resin adhesion, good filler wet out and consequently good mechanical property such as impact and crack resistance. These compatibilizers can also act as a tackifier for a polyolefin matrix and a filler such that they provide a good tack in a calendaring process.

Hydrocarbon Tackifier. The hydrocarbon tackifier of the olefin backing substrate composition can be any hydrocarbon tackifier that can be used in compositions for a floor covering or a laminated surface covering. The hydrocarbon tackifier, when added to resins, can improve the initial and extended adhesion range of one or more substances and/or improve the processability such as calendaring.

According to various embodiments, the hydrocarbon tackifier can be or comprise at least one hydrocarbon. Any hydrocarbon that is suitable in forming a surface covering can be used. The hydrocarbon can comprise an aliphatic hydrocarbon, a cycloaliphatic hydrocarbon, an aromatic modified aliphatic hydrocarbon, an aromatic and aliphatic modified with fatty acid ester or any combination thereof. Preferably, the hydrocarbon tackifier comprises a blend of an aliphatic hydrocarbon resin with aromatic hydrocarbon polymer and functionalized with fatty acid ester, which has a softening temperature at 103 to 113° C. Commercially available examples of the hydrocarbon tackifier include, e.g., ESCOREZ™ from ExxonMobil Corp., and STRUKTOL TR016™, STRUKTOL TR044™, or STRUKTOL TR065™ from Struktol of America.

The hydrocarbon tackifier is present in an amount of from about 0.1 wt % to about 5 wt %, preferably about 0.5 to 2 wt %, based on the total weight of the composition. Other amounts below and above these ranges can be used. This component improves the rheological property of the composition, for instance, this component helps to reduce the flux time and mixing torque, as well as helping to impart tacking property.

Dispersion Agent. The compositions according to the present invention can contain at least one dispersion agent. Any dispersion agent that functions as a dispersant aid for various components of the composition, such as, for filler or a pigment, can be used. Preferably, the dispersion agent comprises at least one ultra high melt flow rate polypropylene homopolymer (UHMFR PP). It is considered a non-migrating dispersion aide, unlike other low molecular weight dispersion aide, which on occasion may migrate to the surface, interfere with adhesion of the olefin substrate with the other surface, such as print, underlayment or adhesive, etc. Some low molecular weight dispersion aides also typically have negative impact on stiffness, and thus indentation resistance. By comparison, the UHMFR PP dispersion aid not only effectively dispersed the pigments and filler, but also helps to improve the stiffness and indentation recovery as well as reducing mixing time and/or mixing temperature. For purposes herein, the term "UHMFR" refers to resins with a melt flow rate much greater than 100 g/10 min. as measured by ASTM D 1238 at 230° C. and 2.16 Kg. A polyolefin having a melt flow rate (MFR) greater than 100 g/10 min as measured by ASTM D 1238 at 230° C. at 2.16 Kg is generally considered very fluid in this field. The preferred UHMFR polyolefin used in this embodiment is an isotactic polypropylene having an isotactic index greater than 80% (e.g., 81% to 99%), preferably greater than 90% (e.g., 91% to 99%). This very fluid and high melt flow rate isotactic polypropylene homopolymer can be produced by either by free radical degradation of the polymer in the presence of peroxide which is known in the art or by direct polymerization methods either by Zeigler Natta catalyst or by single site catalyst such as that of metallocene. Preferably the UHMFR isotactic polypropylene used in this embodiment has a melt flow rate from 1000 to 2,200 g/10 min. at 230° C. and 2.16 Kg as measured by ASTM D1238, and more preferably is a peroxide visbroken isotactic polypropylene having a melt flow rate of 1200 to 2000 g/10 min. Examples of such polymers are VALTEC™ and METOCENE™, which are commercially available from Basell Polyolefin.

The ultra high melt flow polypropylene may be present in an amount of from about 0.1 wt % to about 5 wt %, preferably from 0.5 to 2 weight %, based on the total weight of the composition. Other amounts below and above these ranges can be used.

Filler. The filler can be any conventional filler, especially those types traditionally used in surface coverings. The filler can be organic, inorganic, or a combination of both, such as with different morphologies. An inorganic filler can provide dimensional stability and/or reduced elasticity to a resilient compositional tile, and may provide properties of fire resistance. Examples include, but are not limited to, coal fly ash, calcium carbonate, barium sulfate, carbon black, metal oxides, inorganic material, natural material, alumina trihydrate, magnesium hydroxide, bauxite, talc, mica, barite, kaolin, silica, post consumer glass, or post industrial glass, synthetic and natural fiber, or any combination thereof. Preferably, the filler comprises talc, mica, calcium carbonate, barite, kaolin, silica, glass, or any combination thereof. More preferably, the filler comprises calcium carbonate from limestone and has a particle size from about a 40 mesh to about a 50 mesh, although smaller particle size fillers can also be used.

As a non-limiting example, limestone (calcium carbonate with magnesium carbonate) can be used as the filler. A specific non-limiting example is untreated dolomitic limestone (which can be screened), having an upper mesh size of about 50 mesh. Dolomitic limestone is commercially available from Specialty Minerals, Inc. under the product code DF-5025.

The filler can be in any physical form that allows it to be mixed or blended with the other components to form the olefin based composition that can be processed into an olefin based composition tile. Typically, the filler is in the form of particles.

The filler may be present in an amount of at least 50%, preferably from about 60 wt % to about 90 wt %, based on the combined weight of this filler component and the above-described five components (i.e., first polymer, second polymer, polar group-functionalized polyolefin, hydrocarbon tackifier, dispersion agent) of the composition. Other amounts below and above these ranges can be used. For example, the amount of filler can be varied in order to obtain the desired flexural modulus and/or impact balance for a base in a laminated structure.

The compositions according to the present invention can optionally contain one or more additives, such as, antimicrobial, biocides, pigments or colorants, modifying resins, cross-linking agents, antioxidants, foaming agents, other tackifiers, and/or other conventional organic or inorganic additives commonly used in polyolefin or in other surface coverings, such as, but not limited to, UV-stabilizers, antistatic agents, thermal and light stabilizers, flame retardants, or any combination thereof. These additives and how they are incorporated into different compositions or layers of surface coverings are described in U.S. Pat. Nos. 5,112,671; 4,614,680; 4,187,131; 4,172,169, 4,423,178; 4,313,866; and 5,380,794 incorporated by reference in their entireties herein. Preferably, the composition includes at least one pigment, flame retardant, thermal stabilizer, light stabilizer, antistatic, or any combination thereof.

For example, a stabilizer can be added to the composition according to the present invention, to provide heat stability and/or UV light stability to the composition. The stabilizer can be used to minimize degradation and discoloration caused by exposure to heat and light, including conditions encountered in the manufacture of a product containing the composition of the present invention. The stabilizer, according to the present invention, is preferably selected for its effectiveness with the particular homopolymer-copolymer blend of the present invention. The stabilizer can be an antioxidant, other stabilizers, or combinations thereof. Any antioxidant commercially available or known can be used. An exemplary antioxidant/heat stabilizer is a phenolic compound (e.g. Phenol, 2,4-Bis(1,1-dimethyl)-phosphate), commercially known as Irgafox 168, and another antioxidant/heat stabilizer such as Benzenepropanoic acid, 3,5-bis(1,1dimethyl)-4-hydroxy-,2,3-bis[[(3-[3,5-bis(1,1-dimethylethyl)-4)-hydroxyphenyl]-1-oxopropoxy]methyl]-1,3-propanediyl ester which is commercial known as Irganox 1010, both are available from Ciba. Specific non-limiting examples include propertiary blends of the above antioxidants/heat stabilizers which is also supplied by Ciba. under the product codes B225. The typical amount of the antioxidant/heat stabilizer used for the olefin blends in this invention is 0.10 to <0.50 phr. Other amounts below and above these ranges can be used.

The additives can be used and varied in amounts as needed and known to those skilled in the art.

Optionally, at least one component of the composition can be a recycled material. For example, the recycled material can comprise polyolefin, polyethylene, polypropylene, ethylene propylene, olefin copolymers, carpets having an olefin backing with nylon faced yarn, carpets having an olefin backing with olefin faced yarn, glass beads, coal fly ash, gypsum or any combination thereof. The recycled materials may be obtained as post consumer or post industrial polyolefin recycled material or other reusable waste, such as that obtained from polyethylene, polypropylene, or copolymers thereof, such as from film, bottle, or other post consumer or post industrial waste.

In another aspect, the present invention relates to surface or floor coverings comprising the olefin based composition of the present invention. The surface or floor covering can be in the form of a sheet, a tile or a plank. The sheet, tile or plank can have any shape or size. The surface or floor covering can comprise substantially the composition, or can comprise one or more additional layers of material.

According to various embodiments, the compositions of the present invention can be used as a stand alone product, such as an olefin composition tile product. In these embodiments, the surface or floor covering does not contain layers of different material as those of laminated floor coverings. The stand alone product can have one additional layer, such as a protective coating (wear resistant or top coat layer), or no protective coating at all. Any additives, such as those mentioned herein, including pigments, can be added to form the stand alone product.

Alternatively, the compositions can be combined with other materials or layers to form the surface covering, such as a laminated surface or floor covering as further described.

For example, a laminated surface or floor covering can comprise a backing layer comprising the composition of the present invention, wherein the backing layer has a top surface and a bottom surface; a décor layer (or print layer) having a top surface and a bottom surface, wherein the bottom surface of the décor layer is affixed to the top surface of the backing layer; and at least one wear layer having a top surface and a bottom surface, wherein the bottom surface of the wear layer is affixed to the top surface of the décor layer.

In one aspect, the surface coverings, for example, may include: (i) an olefin based composition backing substrate comprising the olefin based composition; (ii) a printed décor layer laminated on top of the polyolefin composition base; and (iii) a radiation cured coating surface including a wear layer. The surface coverings also optionally may include an additional layer(s), such as a glass mat or synthetic film as a layer and/or in any order, thickness and composition of the full construction for the purposes of balancing the structure and performance. The olefin based composition used for the backing substrate also may be varied within the scope of the invention to obtain various stiffness or flexibility and impact balances to provide a base that then can be directly printed on or laminated upon with a printed visual, and a special radiation curing coating for excellent performance and low maintenance specially designed for surface coverings application.

The décor layer, also called a printed visual, can comprise a gravure print, a digital print, a flexo print, a transfer print, a pad print, a stamping print, a decorative painting, or any combination thereof. Any conventional printing means can be used to produce the décor layer. The décor layer can include a substrate, wherein the substrate can comprise one or more polymer (e.g., plastic) films and/or papers (e.g., cellulose). Preferably, the plastic film is a non-polyvinyl chloride (non-PVC) plastic film. The non-PVC film provides excellent dimensional stability against product growth or shrinkage which can exist due to moisture or humidity from the environment. These films may be selected from thermoplastic films, such as acrylic, polyolefin, ionomer, and polyester. Alternatively, a cellulose base paper can be used as the substrate for the décor layer. If cellulose base paper is used, the moisture content of the paper should be controlled or limited to a very low level prior to sealing the paper with coatings. This would prevent any dimensional change of the paper due to absorbing moisture from or releasing moisture to the environment. Thus, dimensional changes to a laminated structure, such as, bowing, doming, curling or warping, can be prevented. Examples of cellulose base layers and methods of incorporating them into laminated or surface coverings are described in U.S. Pat. No. 6,986,934, which is incorporated by reference in its entirety herein. Other types of film or materials for the décor layer are possible.

The printed visual on the décor layer can have any pattern, such as, but not limited to, simulated natural surfaces, such as natural wood, stone, tile, marble, granite, brick appearance, or the like. As a non-limiting example, a décor layer comprises a design layer that has chemically or mechanically embossed textures in register so as to simulate such features found in natural surfaces can be used (e.g., grout lines, wood grain, wood knots, ceramic surface textures, and the like). Any ink composition can be used, such as those that contain an acrylic resin, water, alcohol, and one or more pigments. A design can be done in register using multiple station rotogravure printing.

Optionally, the décor layer can comprise a printed design on an aminoplast resin impregnated printed design, as described in U.S. Pat. No. 6,986,934, which is incorporated by reference in its entirety herein. The aminoplast resin is a blend of urea formaldehyde and a melamine formaldehyde. The printed or décor layer can be located on top of an underlay which comprises a Kraft paper impregnated with aminoplast resins or phenols.

Embossing in the décor layer can be provided mechanically as well. For purposes of mechanical embossing, generally, the pressure applied to the layer is sufficient to create an embossing of, for example, from about 1 mil to about 12 mils, more preferably from about 3 mils to about 8 mils. It is certainly within the bounds of the present invention to use several devices to mechanically emboss different textures onto the layer.

A wear layer forming at least a portion of a surface covering according to this invention can be provided as a single layer, or, alternatively, may comprise a multiple layer construction for a variety of purposes, such as providing strength, providing wear resistance, providing mar or stain resistance, and the like. A wear layer can comprise unsaturated functional acrylates, with or without, aluminum oxide and other wear resistant particles. Preferably, the unsaturated functional acrylates comprise epoxy oligomers, urethane oligomers, polyester oligomers, or any combination thereof. Alternatively, the wear layer can comprise reactive monomers, wherein the reactive monomers can include a mono-functional diluent, a di-functional diluent, a multi-functional diluent, or any combination thereof. Other components can be present in one or more resistant layers, such as, but not limited to, at least one surfactant, at least one defoaming agent, at least one abrasive resistant particle, or any combination thereof, and optionally, at least one photoinitiator. If a photoinitiator is used, the wear layer can be cured by electron beam or radiation, such as ultraviolet.

Aluminum oxide can be used as an abrasive in a wear layer included in a surface covering according to the present invention. It is also known as alumina or $Al_2O_3$. Preferably, the aluminum oxide is fused or calcined. The refractive index is preferably from about 1.4 to 1.7. Other wear-resistant particles can be used and can include, but not limited to, carborundum, quartz, silica (sand), glass particles, glass beads, glass spheres (hollow and/or filled), plastic grits, silicon carbide, diamond dust (glass), hard plastics, reinforced polymers, organics, and the like, and may be substituted for all or part of the alumina.

Also, while any source of aluminum oxide can be used, it is preferred that the aluminum oxide have the following characteristics: fused or calcined and having a hardness of from about 6 to 9 on a Moh's scale, and most preferably about 9 on a Moh's scale. Preferably, the particle size of the wear-resistant particles is from about 10 microns to about 350 microns, and more preferably from about 20 microns to about 250 microns, and most preferably from about 20 microns to 200 microns. Sources for preferred aluminum oxide are Washington Mills, N. Grafton, Mass.; ALCOA Industrial Chemicals, Bauxite, Ark.; Composition Materials, Fairfield, Conn.; Micro Abrasives, Westfield, Mass.; and Alu Chem, Inc. Birmingham, Ala.

As a non-limiting example, the wear layer can comprise two layers as described herein. More than two coating layers, such as three, or four or more (and with the same or different compositions) can be used. A first coating layer can include a semi-cured B-stage cure that is used to receive a second coating layer for good adhesion. A second coating layer can include a cure that is similar to the formulation of the first coating layer, but without any abrasive particles. The second coating layer can be applied on the surface of the first coating layer, or directly on an embossed texture surface of a release film. In this later option, the release film with the second coating layer can then be applied on the surface of the first coating layer. Both layers can be wet at first and then cured. The release film can provide a gloss control of the finished product. If the release film is used, an electron beam can be used to penetrate the film and cure the coating layer(s) by achieving cross-linking of oligomers and monomers of the coating layers. Various commercial grades of high abrasive decorated and coated layers comprising one or more wear layers are available, such as a product available under the trade name ELESGO™ from DTS-Systemoberflachen (Germany), or those supplied by W.K.P. (Germany).

The preferred polymerizable cross-linking monomers in a strengthening or wear layer are the mono-, di-, tri- and tetrafunctional acrylates and methacrylates and blends thereof prepared by the esterification of the appropriate alcohols with acrylic or methacrylic acid. The most preferred polymerizerable cross-linking monomer is trimethylolpropane trimethacrylate. Other preferred monomers are trimethylolpropane triacrylate, pentaerythritol tetraacrylate, and pentaerythritol tetramethacrylate. Monofunctional and/or difunctional acrylates and methacrylates, such as 2-ethyl-hexyl acrylate, lauryl methacrylate, hexanediol diacrylate and diethylene glycol dimethacrylate, may be blended with the tri- and/or tetra-functional cross-linking monomer to reduce cross-link density. Other monomers can be used.

The preferred free radical polymerization for purposes of the strengthening layer or wear layer is by radiation curing. A radiation curing process can be used to initiate cross-linking reactions among all reactive materials in the system by means of high energy electron beam or ultraviolet radiation. Creating free radicals for UV curing requires the use of photo-initiators as well as reactive monomers and pre-polymers. Photo-initiators decompose on exposure to UV light to produce initiating free radicals, which start the chain reaction until reactive ingredients becomes polymerized, solid and dry. A three dimensional network of hard solid dry coating is then formed. Photo-initiators can be grouped into 4 classes based on their chemical behavior on photolysis. Class 1: Aromatic ketone initiator functions via a H-atom abstraction process. Initiators commonly used in this class are Benzophenone; 4-phenyl Benzophenone and the like Class 2: initiators undergo a fragmentation on exposure to UV. The more widely used photo-initiators in this class are Benzoin, Benzoin ethers. Class 3: Tertiary amines/H-atoms Abstraction photo-initiators such as triethanolamine/benzophenone; methyl diethanolamine/benzophenone. Class 4: photo-initiators derived from acetophenone, which functions by either H-atom abstraction process or fragmentation. The broadly used photo-initiators in this class are 2,2 diethoxyacetophenone; $\alpha\alpha$ dichloroaceto, $\rho$-phenoxyphenone. Radiation pre-polymers can generally be categorized as Epoxy Acrylates; Urethane Acrylates; Unsaturated Acrylates; Polyester Acrylates; Polyether Acrylates and Vinyl/Acrylic system. The selection of the reactive monomers, pre-polymers as well as photo-initiators will dictate the amount of cross-link density of the strengthening or wear layer. Other additives can also be used.

A wear layer can be provided as a top coat layer of a surface covering according to this invention. As a non-limiting example, a wear layer top coat can comprise a hard, thermoset, UV-curable blend of acrylic or acrylate monomers having a glass transition temperature (Tg) of greater than 30° C. The thickness of a wear layer top coat, once cured, can be from 0.3 mils to 1.5 mils, more preferably from 0.5 mils to 1.0 mils. The wear layer top coat must not be too thin or a poor stain resistance results, but it must not be too thick or cracking may result.

The bottom surface of the décor layer can be affixed to the top surface of the olefin based backing layer comprising the olefin based composition or other substrate by materials such as a primer/adhesive, such as a hot melt, moisture cure polyurethane glue. Examples of such adhesives and their applications are described in U.S. Pat. No. 6,986,934, which is incorporated by reference herein in its entirety. A preferred hot melt adhesive is Ever-Lock® 2U145/2U230 modified polyurethane adhesive reactive hot melt from Forbo Adhesives, L.L.C.

In one particular aspect, surface covering according to this invention comprises a backing substrate comprising an olefin based composition according to embodiments herein, a décor layer, and a radiation cured top coating system including at least one wear layer, wherein the décor layer comprises a multilayered laminate based on a non-PVC film decorated with pattern and color by any printing means. Various commercial grades of highly abrasive decorated and coated layers that can be used in the décor layer structure are available in the marketplace, such as the above-referenced ELESGO™ product supplied by DTS-Systemoberflachen in Germany, or those available from W.K.P. in Germany. The printed décor preferably is initially coated with a primer on the back of the film to enhance adhesion of the printed film to the top surface of the olefin based composition backing substrate.

In this particular aspect, the opposite top surface of the printed décor preferably is coated with a radiation cured top coating system comprising (i) unsaturated functional acrylates including epoxy, urethane, and/or polyester type oligomers, (ii) reactive monomers including mono-functional, di-functional and/or multi-functional diluents, (iii) other ingredients, such as surfactants, defoaming agent and abrasive resistance particles such as aluminum oxides, etc., and optionally, (iv) a photoinitiator, depending upon the means of radiation cure. When choosing ultraviolet light as the means to cure the radiation curable coating system, the photoinitiator generally is present for the coating. However, the photo-initiator can be omitted if this coating is cured by an electron beam system. The first radiation curable coating layer of the radiation curable coating system generally must be semi-cured, i.e., B-stage cure, before receiving a second coating layer for good adhesion. It also may include an abrasive particles, such as with particles sizes ranging from 20 to 200 microns or particle sizes less than 100 nanometers (e.g., 10 to 99 nm). Preferably the formulation of the second radiation curable coating layer is very similar to the first coating layer except for removal of abrasive particles. The second radiation curable coating can be directly applied on the embossed texture surface of the release film or applied on the surface of the first B-stage cured coating. A release film with surface texture can then be laid on the surface of the wet second coat prior to curing the coating. Alternatively, the release film with the second wet coating can lay on the surface of the first B-stage coating. The release film with the surface texture provides the embossed texture and also the gloss control of the finished product. The electron beam process is a suitable way to cure the product in this process because the electrons can penetrate the thick release film in order to reach the active ingredients in the coating being irradiated. This electron beam curing process can be used to achieve crosslinking of oligomers and monomers to form a hard film. The cured multiple top coated and decorated layers can be affixed to the top surface of the olefin based substrate by any means, such as with an adhesive. Preferably the adhesive is a hot melt, moisture cured polyurethane glue, such as described in the above-referenced U.S. Pat. No. 6,986,934.

Additional layers can be present in the laminate surface covering according to the present invention. The additional layers can be used for a variety of purposes, such as for reinforcement. For example, the additional layer can comprise an olefin blend, a glass mat, a thermoplastic film, or any combination thereof.

Any of the polymers, additives or fillers mentioned previously for the composition according to the present invention, can be used in the additional layers for the laminated structure. The types of polymers, additives, fillers and their amount (including the thickness and order of the layers) can be chosen and varied for the additional layers, for purposes of balancing the structure and performance of the laminated structure.

Still in another aspect, the present invention relates to methods of making the olefin based compositions, and the surface or floor coverings containing the compositions.

The components of the olefin based composition or the composition itself can be in any physical form suitable for storage and/or for use to form the composition or the surface covering. For example, many of the components are typically solid ingredients and are typically in particulate or pellet form. Accordingly, these components can be mixed in any order and by any method known in the art for combining particulate solids. If any liquid components are used, such as a dispersion aid or processing aid, they can be blended into the resulting mixture. The composition can be premixed and stored for a period of time prior to use, or can be mixed just before, or even during, a process for manufacturing a surface covering.

The olefin based composition can be made by any conventional method. The olefin based composition can be processed by numerous methods known in the art including, for example, sheet extrusion, thermoforming, injection molding, calendaring, profile extrusion, blow molding, and casting. For example, the olefin based composition can be made by mixing the components of the composition or extruding the composition in a twin screw, a single screw, a Banbury mixer, an extruder with a slot die, or any combination thereof to form a blend. Preferably, the composition can be processed by processing the polymers, polyolefin, hydrocarbon, dispersion agent, or any combination thereof, at a temperature close to or above the melting point of the polymers, polyolefin, hydrocarbon, or dispersion agent. Therefore, a blend of the composition can be added to compounding equipment to mix and heat the blend into a uniform hot mass. The uniform hot mass can then be discharged onto one or more processing machines, such as a 2-roll mill or a calendar roll. A series of calendar rolls can be used to control the thickness and finish of a resulting sheet of the composition. Therefore, the composition can be made in a continuous process or a batch process. This basic composition can be immediately used or stored and later used for any purpose.

According to various embodiments, if the composition is formulated to be a stand alone product such as multiple-colored and/or variable sized chips (although the chips can be a single color or a single size), one or more color additives can be added to the composition. Once the sheet of composition as described above, is hardened, it can then be chipped. The compositions or chips can be stored for future use or they can be immediately and additionally processed to a surface or floor covering, such as a sheet, a compositional tile, or a plank. For example, the multiple-colored or variable sized chips can be consolidated on a belt with an infrared heater and then calendar rolled to produce a sheet. Therefore, in this embodiment, a stand alone or homogenous product can be made from the composition according to the present invention, which does not include a laminated décor layer and protective top coat layers. That is, the olefin based composition can be made into a homogeneous compositional tile with multiple colors chips and variable chip sizes as a mean of decorative visual for a stand alone product without a laminated décor layer. The visual of this product is known in the art as chip visual, and is characterized by its different performance, surface patterns, solid or multiple colors, or through pattern effect as compared to an olefin based laminate structure. A compositional tile with the chip visual and composition according to the present invention can be made by using any vinyl composition tile process. Optionally, the resulting chips from this process can be added on top of a sheet of an olefin based composition as described above that is being processed, in order to yield different product visuals and/or performance characteristics. These chips or sheets can be immediately used or stored and used at a later time for any purpose. The flooring article made with or from the olefin based composition can optionally also contain a coating(s) that provides good scratch and stain resistance, such as a urethane containing or urethane top coat.

In another aspect, a heterogeneous construction is provided that is defined as multiple distinctively layered sheets in the thickness dimension of the construction, such as the above-described surface covering including a substrate backing comprised of the olefin based composition, a printed décor layer, and optionally one or more wear and scratch-resistant coatings. The surface coloring or decorating elements generally need not extend through the entire thickness of the floor coverings, but may be present on one single layer in the construction.

Any conventional step known in the art can be used to make a surface or floor covering, such as a laminated sheet, tile or plank, which includes the olefin based composition exemplified herein.

For purposes of the present invention, the surface or floor covering of the present invention can be made in any manner typical for making such. As a non-limiting example, tiles of the present invention can be a through-chip tile or a tile made by a scratch method as those terms are understood by one skilled in the art. Generally, the tiles of the present invention can be made by taking the components of the composition and mixing them together, such as with a Banbury mixer, kneader, or the like. The mixture can then be introduced to a two-roller mill, which are heated, such as at a temperature of from about 290° F. to about 400° F., though other temperatures are possible. The temperature should be close to or at the melting point of the components of the mixture. This produces a sheeted material. At this point, accent colors, such as colorants or other accent materials, can be optionally added (although other additives as previously described can be added), and then the sheeted material is cooled, such as to a temperature of 120° F. to about 150° F., though other temperatures are possible. Then, the sheeted material can be hammered or crushed into chips, which can then be subsequently blended and then reheated, such as to a temperature of 280° F. to about 330° F. This molten material is then passed through a two-roll mill and then a series of calendared rolls to form a sheeted material with desirable thickness. The material is cooled, again, such as at a temperature of 100° F. to 130° F. Optionally, a finish or polish layer or other protective layer(s) can be applied and then the sheeted material is punched into tile form. As an option, the crushing or hammering of the material and re-blending and re-heating of the material is completely optional, depending upon whether one wishes to make a through-chip tile solid color or a scratch tile.

The tiles can be cut by any method known in the art. For example, rolled or calendared olefin based composition according to the present invention can be cut into standard 12 inch×12 inch floor tiles by any known method. The thickness can be, for instance, ⅛ inch. The tile of the present invention may be combined with conventional flooring elements such as backing elements, adhesives and wear layers as well as a radiation curable urethane acrylate top coating. Other sizes and thicknesses are possible.

The sheet containing the composition of the present invention, as described above, can be used as a backing layer to form a laminated surface or floor covering. Along with this backing layer, a décor layer and one or more wear layers as previously described, can be used to form the laminated structure. Any conventional method for making the décor layer or the wear layer can be used. Additional layers can be added to this structure in any combination.

For example, a laminated floor covering having various layers as described in U.S. Pat. Nos. 6,291,078; 6,228,463; 6,218,001; 6,114,008; 5,961,903; 5,955,521; and 5,494,707, which are all incorporated by reference in their entireties herein, can be modified with the present invention. Any methods of providing the design, the embossing, and/or the various layers can be used, such as described in U.S. Pat. Nos. 6,986,934; 6,555,216; 5,961,903; and 5,494,707, which are all incorporated by reference in their entireties herein.

The top surface of the backing layer can be treated with a corona treatment, heat or plasma treatment, sanding, or any combination thereof. A polyurethane hot melt adhesive can be applied to the bottom surface of the décor layer. The bottom surface of the décor layer with the polyurethane hot melt adhesive can then be affixed to the top surface of the treated backing layer. Optionally, the wear resistant layer can be cured with electron beam or radiation.

Certainly, for purposes of the present invention, additional layers not specifically mentioned above, can be used, such as, one or more reinforcement layers, pre-coat layers, additional intermediate or laminate layers, and/or additional backing layers which can be the same or different. In each case, each layer can be affixed in some manner such as by casting, adhesive, or other means conventional in the art. Multiple layers for wear resistant resilient coverings are described in U.S. Pat. Nos. 3,870,591; 5,494,707; and 6,555,216, which are incorporated by reference herein in their entireties.

For purposes of the present invention, any embodiment can contain more than one type of layer, e.g., more than one pre-coat layer, more than one laminate layer, and so on. Any combination is possible. In addition, blowing agents, catalyst, fillers, surface-active additives, flame retardants, anti-microbial agents, and other conventional ingredients can also be present in any of the layers.

Various coatings or layers are discussed previously and below, and unless stated otherwise, are preferably of a substantially uniform thickness and can be applied using techniques known to those skilled in the art. The preparation of the composition for each layer can be by any technique known in the art. For example, the preparation of the composition for the hot melt laminate layer can be accomplished with a variety of mixing techniques. Preferably, the compositions of the laminate layer, or any layer, are produced by compounding in a hot-melt mixer, using a batch process. The compositions can then be stored at an elevated temperature until needed. Alternatively, the compositions can be produced in a continuous mixing process and/or using a compounding extruder. The compositions produced by this process can be applied directly to the coating line. They can also be cooled and pelletized until needed. The pellets can be reheated prior to application or stored in a molten state until needed.

The sequence of forming any of the various layers is not critical to the present invention. Production of the tiles or laminated structure can include the intermediate steps of forming one or more laminate strata by joining two or more constituent layers together. Furthermore, one or more of the layers may be formed "upside down" relative to the orientation of the finished product as a floor covering. Thus, directional references are merely given for the purpose of aiding the reader and are not intended in any way to limit the scope of the present invention.

In each case, the individual layers described above, are affixed in some manner such as by casting, extruding, and/or laminating the various layers on a previously formed layer, or by other means conventional in the art. As an alternative to using the backing layer as the substrate on which all other layers are applied, it is certainly within the bounds of the present invention to form any layer of the surface covering first and then add other desirable layers to the top and/or bottom surface of the first layer formed.

The compositions according to the present invention can comprise components that provide synergy in performance properties. The compatibilizer that is used in the composition can provide both compatibility and synergy when used in combination with other components, such as a co-compatibilizer or tackifier and a dispersion agent. More particularly, the compositions according to the present invention can provide compatibility and synergy between functionalized polyolefin compatibilizers, co-compatibilizers or tackifiers such as hydrocarbons or other polyolefins, and dispersion agents such as an ultra high melt flow rate polypropylene or a lubricant.

The construction of the laminated surface covering according to the present invention provides flexibility for varying the amount of fillers. This provides a variety of possible flexural modulus and impact balance. The result is excellent performance and low maintenance, especially for flooring applications. For flooring applications, other desirable properties attained by using the composition or laminated structure according to the present invention include attractive visual, excellent stain resistance, excellent scratch resistance, no or little polish maintenance. Additionally, it is a better alternative and environmental friendlier than the existing conventional PVC based flooring products.

Where the composition of the present invention is used as a stand alone product, better performance such as excellent stain, heat and light resistance and resistance to crack and high static load are obtained, as compared to those of the conventional vinyl composition tiles. Such products according to the present invention are also desirable in that they contain no halogens or plasticizers.

The choice in resins used for the composition according to the present invention allows a comparative cost to production of surface covering products compared to conventional surface coverings. The composition according to the present invention are different than the conventional products by the polymerization and catalyst system as well as their molecular properties, wherein conventional products are based on the use of substantially linear ethylene/octene polymers instead of the present invention's random high impact and in-situ rubber content of other ethylene propylene copolymers. Added properties to surface coverings using the compositions according to the present invention include reducing torque in mixing of the components, while maintaining or increasing certain performance properties, such as, the higher modulus of the material, the resistance to indentation, crack, heat, and/or light.

The composition according to the present invention allows for a surface covering, that can be laminated and can have excellent performance as a floor covering. The construction of these laminates provide the flooring with attractive visual, excellent stain, scratch resistance and low maintenance, e.g., no wax/no polish maintenance. Although illustrated for use in surface and floor coverings, the olefin based composition illustrated herein also can be formed into and used in combination with other materials in other useful articles.

The following examples are intended to illustrate the invention especially for floor covering application where sheet, flooring tile and laminate structure are made by conventional calendaring and lamination process. The invention is illustrated by the following Examples, in which parts are proportions by weight unless otherwise specified. The following testing procedures are used to evaluate the performance properties of the samples made according to the invention.

TABLE A

| Performance Properties | Method |
| --- | --- |
| Static load Indentation @ 750 psi., mil or 1/1000" of indent depth | ASTM F970-00 |
| Static load Indentation @ 2000 psi; mil or 1/1000" of indent depth | ASTM F970-00 |
| Impact - Small ball impact test, 1" ball dia., Height: 20", W = 65 grs.) | ASTM F1265-90 |
| Elongation @break (cross head speed 2"/min.), % | ASTM D-638-97 |
| Tensile strength @ break (cross head speed 2"/min.), psi | ASTM D-638-97 |
| Tensile Modulus (cross head speed 2"/min.), psi | ASTM D-638-97 |
| Indent (1 min. w/ 30 lbs.) (cone foot) - mil or 1/1000" of indent depth | ASTM F-1914 |
| Abrasion (Taber abrader w/ H-18 wheel, 1000 cycles, 1000 gr. load), thickness loss, 1/1000" or mil. | ASTM F510-93 |
| Abrasion (Taber abrader w/ H-18 wheel, 1000 cycles, 1000 gr. load), weight loss, grs. | ASTM F510-93 |
| Deflection, report inches of deflection | ASTM F1304-03 |
| Melt Flow Rate (MFR), g/10 min. | ASTM D1238 |
| Heat Stability, Del E | ASTM F1514-03 |
| Light Stability, Del E | ASTM F1515-03 |
| Stain Resistance Test | ASTM F925-02 |

EXAMPLES

Example 1

In this example, the effect of each of the composition components, such as compatibilizer, dispersion aide and tackifier, on the mechanical property, performance characteristics, as well as rheological properties, of an olefin based substrate composition for a surface covering was investigated. All samples as shown in Table 1 (see FIG. 1) were made by dry blending of all components and fed directly onto the nip of a 2-roll mill. In the tables described herein, "MAH-g-PP" refers to maleic anhydride functionalized polypropylene, "MAH" refers to maleic anhydride, "MFR" refers to melt flow rate, and "HC" refers to hydrocarbon. The temperature set for the front and back roll was 370° F. A continuous melting, mixing and sheet forming took place on the 2-roll mill surface and between the 2-roll mill's nip. Filler wet out, mixing time, sheet formation, sheet tack and sheet release characteristics were observed from the processing of the 2-roll mill. Sheets with thickness at about 60 mils were formed from the 2-roll mill. Two sheets with 60 mil thick was then heated in a oven set at 430° F. for 7 min., then cold pressed at 200 Kpsi for 3 min., to yield sheet with thickness ~120 mils with good surface smoothness for mechanical property testing. Table 1 shows mechanical properties of the Samples 1A, 2A, 3A and Control Formula 1 made from the process described above.

In order to evaluate the melt rheological property of each blend, 100 grams of a mixed compound blended with all components together were run on a lab scale Brabender plasticorder where the mixing temperature, mixing torque and flux time or dispersion time were recorded as shown in Table 1. Component analysis of each ingredient in the formula was done with the control formula; just the EP copolymer and filler. The mixture appeared "dry" as the melted polymer was unable to fully wet out the filler. Overall, the blend was marginally acceptable; the mixing time was long, approximately 6 min. and the sheet formed had no tack. As particular observations: Sample 1A: Adding STRUKTOL TR-065™ tackifier into the control formula showed slightly better in tack than the control formula, but the tack was still not enough to stay on the surface of the roll; part of the sheet fell off the 2-roll mill. Nevertheless, adding a tackifier in the control formula yielded better tensile strength at break, modulus of elasticity, and deflection strength as well as a significant improvement in reducing the mixing time, mixing torque and stock temperature than the control formula. The crack resistance and indentation, however, were still poor. Sample 2A incorporates the ingredient of UHMFR polypropylene homopolymer into the control formula, which helped to wet out the filler better as indicated by a reduction in the mixing time and temperature and an improving in stiffness and indentation as compared to Control Formula 1. However, tack for a sheet of Sample 2A was about the same as Sample 1A, which was not acceptable. Sample 3A incorporated the ingredient of the MAH-g-PP into the control formula, which improved the tack far better than the sheet formed from formulae of the Control Formula 1, and Samples 1A or 2A. Sample 3A also yielded desirable properties including rheological properties as indicated by lower mix time, and mixing temperature, greatly improved impact and crack resistance, indentation, abrasion, as well as deflection properties. This significant improvement in properties and tack of Sample 3A is believed to be due to the effect that the MAH-g-PP has on interfacial bonding of the filler with the polymer binder.

Example 2

Additional compositions were prepared and investigated with results described in Table 2. Although Sample 3A in Table 1 showed good property and improvement in tack, it was further discovered that the combination of all components yielded the most desirable property and processing characteristics. As the results of these further studies, Table 2 (see FIG. 2) illustrates the effect of compatibilizer, dispersion aide and tackifier and the combination thereof on the mechanical property, performance characteristics as well as rheological properties. Preparation of Samples 1B-5B, as shown in Table 2, was similar to the preparation of Samples 1A-3A in Table 1.

Sheet formations for Samples 1B-5B in Table 2 had far better tack than Samples 1A-3A in Example 1. The combination of MAH-g-PP and UHMFR PP in Sample 1B of this Example 2 yielded a sheet with the highest tack, followed by Sample 3B, where a combination of MAH-g-PP and a tackifier was used, and Sample 2B, where UH MFR PP and tackifier were used, had the least tack. Too much tack in Sample 1B caused some ripples on the sheet due to hard release property of the sheet from the 2-roll mill. Sample 3B had just the right amount of tack. It was further discovered that the combination of all three components as shown in Samples 4B and 5B provided the best overall performance in sheet forming processing as shown by further reducing in mixing time, mixing torque as well as mixing temperature. Sheets formed of Samples 4B and 5B had excellent tack and smoothness.

Sample 3B and 4B in Example 2 both have comparable and desirable properties, and they were far better than Control Formula 1 of Example 1, as well as the Samples 1A-3A made with just an individual component as shown in Example 1. A further discovery was that the use of a compatibilizer, such as maleic anhydride functionalized polypropylene, in combination with a tackifier and a dispersion aide yielded a synergistic effect in the overall performance as well as the ease of process in blending such a high filler level of inorganic material. This invention overcomes the difficulties of calendar processes using very high filler with a non-polar polymer binder system such as polyolefin by formulating a right combination of dispersion aide, compatibilizer and tackifier together. Table 2 shows that sample 5B was a blend with filler content up to 85%, and still had very desirable property and processing characteristics. The improvement in performance properties as well as processing characteristics such as that of Samples 3B, 4B and 5B in Table 2 was due to a better interfacial bonding of the filler with the polymer binder and good dispersion of filler.

Example 3

Additional compositions were prepared and investigated with results described in Table 3 (see FIG. 3). Table 3 shows that Samples 1C-3C were made similar to all examples described in Examples 1 and 2, but the compositions here contained polypropylene homopolymer and ethylene propylene copolymer. All Samples for this Example 3 were run on the 2-roll mill at 400° F. due to the higher melting point of the polypropylene homopolymer. In addition to that, all the samples in this Example 3, after sheet forming from the 2-roll mill, were processed into chips in a Cumberland with screen size 5/16" to yield olefin chips. Olefin chips were then formed in a 11"×11"×0.125" thick frame by heating the chips in an oven at 430° F. for 13 min, followed by cold pressing at 200 Kpsi for 3 min. to form a chip consolidation tile of olefin very much similar to a conventional PVC tile forming process. The performance properties of all samples shown in Table 3 were evaluated from chip consolidation tile with a thickness at 120 mils.

Samples 1C-3C show the effects of each component in comparison with a control formula using no compatibilizer, or dispersion aide or tackifier. The Control Formula 2 showed that at 85% filler level, compounding was very difficult to proceed. It took 6 min. to melt, mix and to wet out the filler. The sheet did not have any tack, and it broke easily. The addition of the UHMFR PP in Sample 1C was observed to help incorporate filler and mixed better than the control formula. Furthermore, it also reduced the melt/mixed/sheet forming time from 6 min. to 3 min. Sheet, however, did not have tack. The addition of the tackifier in Sample 2C helped to slightly improve the tack, but it was still not as good as the addition of MAH functionalized PP in Sample 3C. The improvement in crack resistance, elongation and tensile strength to break as well as better indentation and abrasion resistance in Sample 3C clearly indicated that MAH-g-PP as a compatibilizer has the most significant impact on the performance property and this is due primarily to the interfacial bonding of the filler with the binder.

Example 4

Additional compositions were prepared and investigated with results described in Table 4 (see FIG. 4). This example illustrates the effect of combination of compatibilizer, dispersion aide and tackifier in a 85% filler/olefin blend. The Control Formula 3 in this Example 4 was the same Control Formula 2 as used in Example 3. All samples for this example were made similar to those of Example 3, e.g. via sheet forming, followed by chipping process, and then heat and pressure consolidated. As shown in Table 4, Samples 1D and 2D where a combination of the compatibilizer (MAH-g-PP) with either a dispersion aide (Sample 1D) or with a tackifier (Sample 2D) had far better properties than that of the Control Formula 3, and Samples 1C, 2C, or 3C from Example 3 where only individual components were used. The most significant synergy in the overall properties, however, was observed in Sample 3D where all three components were used. Sheet formation of Formula 3D had excellent tack and break strength. This was a similar trend as observed in Example 2. Formula 3D also had more desirable properties than Control Formula 4, which was 85% filled PVC based product. e.g., Sample 3D had better crack and impact resistance, better breaking strength, improved indentation recovery as well as wear resistance than Control Formula 4.

Example 5

Additional compositions were prepared and investigated with results described in Table 5 (see FIG. 5). The example illustrates the effect of a tackifier on sheet forming processes as well as properties. All Samples made in Example 5 are similar to that in Example 1 and the properties were evaluated from the sheet. As indicated in Table 5, a hydrocarbon tackifier modified with acid, such as that of STRUKTOL TR-065™ (Sample 1E), yielded better properties than the other hydrocarbon tackifier (Samples 2E and 3E) without an acid functional. This may be due to better compatibility of the tackifier which has an acid functionality with the filler, which is more basic in nature.

As to Sample 4E of Example 5, it was observed that a metallocence based UHMFR PP homopolymer also can be effectively used as a dispersion aide as compared to the peroxide visbroken UHMFR PP (Sample 1E), but peroxide visbroken UHMFR PP homopolymer is a more preferable dispersion aide. The better performance of peroxide visbroken UHMFR PP is thought to be due to the fact that there are polar functional groups involved during chain breaking and thus helping the bonding of the binder with the filler as well as the high fluidity of the polypropylene homopolymer assisting in better dispersing them.

Example 6

Additional compositions were prepared and investigated with results described in Table 6 (see FIG. 6). The results in Table 6 illustrate that an olefin composition of an embodiment of this invention, i.e., Sample 1F, can contain up to 88 weight % of inorganic filler: 85 weight % of limestone and 3 wt % of titanium oxide (viz., white pigment). Sample 1F and Control Formula 5 of this example were made similarly to the samples made in Examples 3 and 4; i.e., via sheet forming on the 2-roll mill, followed by chip process, then heat and pressed to form a tile. Sample 1F also demonstrated the usage of an olefin composition tile containing 15 weight % of post consumer glass beads, which is a post consumer waste recovered from automotive and other glass waste sources, available from Dlubak. As shown in Table 6, the performance properties of the olefin based material of Sample 1F were very desirable and far better than that of the Control Formula 5, which was PVC based material that contained no post consumer waste.

At this higher level of filler, and especially including a post consumer waste, typically the breaking strength and crack resistance are expected to be lower than that of PVC based material which contains only 85% inorganic filler content. Nevertheless, it was observed that the olefin based flooring tile made from the composition of Sample 1F had better indention and abrasion resistance, and higher breaking strength and crack resistance, and lighter weight than PVC based flooring tile made with the composition of Control Formula 5. As demonstrated by this example, the Sample 1F formulation comprising the indicated olefin based material, as well as the use of post consumer wastes, provided a material having significantly enhanced environmental friendly attributes.

Example 7

Additional compositions were prepared and staining resistance was investigated with results described in Table 7 (see FIG. 7). The formulations of Sample 1G and Control Formula 6 of this example were processed similarly to that of Sample 3D of Example 4. The results in Table 7 showed that the olefin based composition of Sample 1G representing an embodiment of this invention had better chemical and stain resistance of the Control Formula 6 comprising a PVC based material.

Example 8

Additional compositions were prepared and heat and light stability properties were investigated with results described in Table 8 (see FIG. 8). The formulations of Sample 1H and Control Formula 7 of this example were processed similarly to that of Sample 3D of Example 4. The results in Table 8 show that the olefin based flooring material of Sample 1H had better heat and light stability than the Control Formula 7 comprising a PVC based material, even though the olefin based composition contained only about a 10% level of the heat stabilizer used in the PVC based material.

Example 9

Additional compositions were prepared and adhesion properties were investigated with results described in Table 9 (see FIG. 9). Samples 1I, 2I, 3I and 4I were made similar to Sample 1F of Example 6. The adhesion of various commercial waxes to each of the compositions of Samples 1I-4I were examined and the results are shown in Table 9. The results in Table 9 illustrate another surprising discovery in that highly filled olefin based flooring tile made according to embodiments of this invention had very good adhesion to many of the typical commercial waxes used for PVC products. Many non-PVC materials, especially prior olefin based ones different from ones embodied herein, have not had good adhesion with wax due to their inherent non-polar surface and high surface tension. Some non-PVC products, especially prior olefin based materials, would require a primer before accepting acrylic or other wax. Although not desiring to be bound to any theory, the excellent adhesion of the olefin based formulations of this invention may be explained by a physical absorption of the wax to the highly filled composition tile and/or due to the presence of a compatibilizer, such as MAH-g-PP and other acid functionalized components present in the binder system, such as that of the tackifier.

Example 10

A composition made similar to the composition of Sample 3 D of Example 4 was made into chip visual tiles. Tiles of the sample were tested with a proprietary water based pressure sensitive adhesive available from W. W. Henry Company. There was neither need for a chemical treatment nor a physical treatment, such as back-sanding of the back of the olefin tile or applied primer. The adhesive was spread onto a sterling board to represent a porous concrete substrate using a v-notch trowel $\frac{1}{32}"\times\frac{1}{32}"\times\frac{1}{16}"$ spread rate, and tiles were glued down after 20 min. open time, following by rolling with a 100 lbs. 3-section roller. The glued olefin tiles were set to cure for 24 hrs. The bond was qualitatively checked by peeling and the result indicated excellent bonding without separation from the substrate. The olefin tile glued down panel was also tested by a rolling load where a load of 265 lbs weight set atop of a caster wheel. The test was run up to nearly 8000 cycles without showing displacement of the tile from the glue which is another indication of excellent adhesive bonding of the tile with a water based pressure sensitive adhesive.

Example 11

Additional compositions were prepared and investigated with results described in Table 10 (see FIG. 10). Sample 1J was made similar to Sample 5B of Example 2 except that half of the amount of ethylene propylene copolymer used in Sample 5B was replaced by and blended with an ethylene acrylic acid copolymer neutralized with sodium salt which is known as an ionomer. The ionomer was commercially available from E.I. DuPont de Nemours under the trade name SURLYN™ Ionomer, e.g. SURLYN 8150, which is an ionomer with sodium ion, or SURLYN 9020, which is an ionomer with zinc ion. A blend of ethylene propylene copolymer with ionomer ordinarily would be considered an incompatible blend due to the fact that the former is a non-polar polymer and the later is a polar polymer; and therefore the blend would not be expected to yield good mechanical properties. However, the use of MAH-g-PP in this example illustrated that this functionalized polyolefin can also be used as a compatibilizer for those two polymers. Sample 1J had better stiffness, breaking strength, crack resistance; indentation recovery and abrasion resistance as compared to PVC based material (viz., Control Formula 4 of Example 4). There are also improvements in the stiffness, indentation recovery and abrasion resistance of Sample 1J in comparison to Sample 5B of Example 2, which did not include the ionomer.

Example 12

Several laminate structures were prepared according to this invention by incorporating a highly filled polyolefin based layer with a décor layer and a coating layer via a lamination technique generally known in the art for surface covering production. The olefin based layer used for the laminate structure for this investigation was made similar to the blend formulation of Sample 4B of Example 2. It will be appreciated that other sample formulations of embodiments of this invention, such as Samples 5B, 3D, etc., also could be used. Olefin based compositions formed into various thicknesses can be used. Using olefin based sheets made according to embodiments of this invention, a number of laminate structures A-I were made, which are described in more detail below. Sample 1K representing an embodiment of the present invention was a laminate of structures A and B described below.

A. An 85 mil. thick olefin sheet (i) was adhered to a 0.005" pre-printed cellulose paper (ii) and 0.004" thick radiation cured coating system (iii) as described above. Various commercial grades of high abrasive decorated and coated layers are available in the marketplace such as one supplied by DTS-Systemoberflachen in Germany with the product names of ELESGO™ or supplied by W.K.P. in Germany. The top surface of the olefin base (i) can be affixed to decorated layers (ii) and the cured multiple coated (iii) by any means, such as with an adhesive, a primer, a corona treated or plasma treated or a combination thereof. Preferably the adhesive is a hot melt, moisture cure polyurethane.

B. A fiberglass scrim was sandwiched between two 40 mils thick olefin sheets with heat and pressure, The inter-medium laminate (i) was then adhered to a pre-printed cellulose paper (ii) and a thick radiation cured coating system (iii) as described above. Various commercial grades of high abrasive decorated and coated layers are available in the marketplace such as one supplied by DTS-Systemoberflachen in Germany with the product names of ELESGO™ or supplied by W.K.P. in Germany. The cured multiple coated and decorated layers can be affixed to the top surface of the olefin based substrate by any means, such as with an adhesive. Preferably the adhesive is a hot melt, moisture cured PU glue.

C. Structure C was identical to structure B but contained two fiberglass scrims.

D. An 85 mils thick olefin sheet (i) was adhered to a 0.010" thick back printed, acrylic film (ii) with an UV curing urethane coating (iii). Such film is commercially available from CFC International, e.g. NEOCLAD ECR34110™. The adhesive used was a hot melt, moisture cured polyurethane adhesive.

E. This structure was similar to that of (i) in B with a fiberglass scrim; the printing layer (ii) and coating system (iii) was similar to that in D.

F. Structure of F was similar to D and E where the 2nd high wear resistance UV cure coating system was applied on top of the first urethane coating.

G. Structure of G was similar to that of D and E with the exception of replacing the UV cured urethane coating with a high clarity and high performance SURLYN™ ionomer film, or polypropylene film or polyethylene film or polyester film. The top layer was adhered to the printed layer by any means either by surface treating the printed visual or the back of the high clarity film by corona discharge or by plasma or by hot melt adhesive or combination thereof. Various thicknesses can be used.

H. Structure of H was similar to A and B except in place of printed visual (ii) and high performance EB cured coating system (iii), the top of the olefin base (i) was adhered to a 0.003" pre-printed urethane. The urethane can optionally have another high performance coating on top.

I. Structure of I was similar to that of A and B, except in place of printed visual (ii) and high performance EB cured coating system (iii), the olefin backing (i) was adhered to a multi-layer structure where such multi-layer structure consisted of (from top to bottom order): a) a 0.003" thick high performance, high clarity ionomer film, b) a 0.005" thick of pre-pigmented ionomer film, c) a 0.002" thick of polyolefin tie-layer, d) a 0.005" up to 0.015" thick thermoplastic polyolefin (TPO) where all layers (a) thru (d) were made by a co-extrusion process. Such a product is available from A-Schulman under the trade name INVISION™. Such a pre-pigmented multi-layer structure has very unique visual, such as metallic and marble, and very good UV and wear performance. The above said multi-layer structure can be adhered to the olefin base (i) by either heat and compression, or an olefin based adhesive.

For illustration purposes, some outstanding performance characteristics observed for Sample 1K comprising a laminate structure combining structures A and B, as made according to an embodiment of this invention, are shown in Table 11 (see FIG. 11), and also those of a Comparison Sample A representative of structures known in the art comprising a multi-layer structure laminate made from a PVC where the structure also contained a high PVC performance wear layer and a high performance urethane UV cured coating. The olefin laminate of Sample 1K made according to an embodiment of this invention had outstanding stain resistance, scratch resistance and wear resistance. Floor coverings made from the laminate of Sample 1K required no waxing and no stripping, and thus, is a low maintenance floor covering.

Example 13

The ability to recycle the olefin composition as described in this invention is demonstrated in Table 12 (see FIG. 12). Sample 1L was made by processes as described in Examples 4 and 6. Tile formed from Sample 1L was then spread with a water based acrylic adhesive on the back of the tile and let dry for 24 hrs. In this example, instead of a water based pressure sensitive adhesive as in Example 10, a water based acrylic adhesive was used and this was also a very good adhesive for the olefin tile. The cured adhesive-covered tile was then chipped into pieces via a Cumberland with screen size of ⅛" to represent a "post consumer" source. Sample 2L and 3L used this "post consumer" source at a loading of 50 wt % and 80 wt %, respectively, and the balance of the formulation was with virgin resins to yield a composition similar to the initial Sample 1L. Samples 2L and 3L mixes were then processed through the heated 2-roll mill followed by chip forming and tile forming as described in Examples 4 and 6. It is typical to expect that the use of a "post consumer" or material that went thru a multiple heat cycles would generally have deteriorated ductility properties and/or may become discolored. This invention shows that tile formed from Sample 2L and 3L yielded properties comparable to the initial material; sample 1L as shown in FIG. 12. Using the mean value, standard deviation and performing statistical analysis, properties such as elongation to break, tensile strength to break, impact resistance and deflection are not statistically significant different than that of the initial samples 1L. Sample 2L and 3L have no yellowness problem, either. Example 13 illustrates the ability to recycle olefin tile where removing the installed tiles can be used as a post consumer source and can be remade into new flooring tile with the post consumer content up to 80 wt % by total product weight without significantly or negatively affecting the performance properties.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present teachings will be apparent to those skilled in the art from consideration of the specification and practice of the present teachings disclosed herein. It is intended that the specification and examples be considered as exemplary only, with the true scope and spirit of the present invention being indicated by the following claims and equivalents thereof.

What is claimed is:

1. A composition for a surface covering or portion thereof comprising:
   a) at least one first polymer that is an ethylene propylene copolymer having a melt flow rate of from 0.5 to 15 gram/10 minute and having a melting point of from 140° C. to 160° C., a flexural modulus from 50 MPa to 400 MPa and a density of from 0.87 to 0.90 g/cm$^3$;
   b) at least one second polymer different from the first polymer,
   c) at least one polypropylene having at least one polar group selected from an unsaturated carboxylic acid group, maleic anhydride group, acrylic acid group, ethylene methacrylic acid group, or methyl acrylate group, wherein said polar group is present in an amount of from 0.1 to 10 wt % based on the weight of said polypropylene, and said polypropylene has an isotactic index of from 85% to 95% and having a melt flow rate of from 100 to 450 gram/10 minute,
   d) at least one tackifier comprising at least one hydrocarbon, wherein the hydrocarbon comprises an aliphatic hydrocarbon, a cycloaliphatic hydrocarbon, an aromatic modified aliphatic hydrocarbon, an aromatic and aliphatic hydrocarbon modified with at least one fatty acid ester or any combination thereof,
   e) at least one dispersion agent comprising at least one ultra high melt flow polypropylene, the ultra high melt flow polypropylene comprising a melt flow rate of from 1000 to 2,200 gram/10 minute as measured by ASTM 1238 at 230° C. and 2.16 Kg and wherein said ultra high melt flow polypropylene is isotactic with an isotactic index of greater than 80%, and
   f) at least one filler.

2. The composition of claim 1, wherein the second polymer comprises at least one polypropylene homopolymer.

3. The composition of claim 2, wherein the polypropylene homopolymer is made by Ziegler Natta polymerization.

4. The composition of claim 2, wherein the polypropylene homopolymer has a melt flow rate from about 5 to about 35 g/10 min. at 230° C. and 2.16 Kg according to ASTM D1238 and/or an isotactic index of at least 85%.

5. The composition of claim 2, wherein the polypropylene homopolymer is present in an amount of from about 0.1 wt % to about 20 wt %, based on the total weight of the composition.

6. The composition of claim 1, wherein the first polymer is a Ziegler Natta-catalyzed ethylene propylene copolymer and/or the second polymer comprises at least one metallocene polymer.

7. The composition of claim 1, wherein the first polymer is a Ziegler Natta-catalyzed ethylene propylene coplymer and/or the second polymer comprises at least one terpolymer or at least one copolymer of ionomeric resins.

8. The composition of claim 1, wherein the ethylene propylene copolymer is a C$_2$ and/or C$_3$ copolymer made from a polypropylene homopolymer or random copolymer matrix and a Ziegler Natta catalyst.

9. The composition of claim 8, wherein the C$_2$ and/or C$_3$ copolymer is a thermoplastic elastomer having a rubber phase present in an amount of 30 to 70 wt %, and the ethylene is present in an amount of 20 to 50 wt %, based on the weight of the random copolymer matrix.

10. The composition of claim 1, wherein the ethylene propylene copolymer is present in an amount of from about 5 wt % to about 45 wt %, based on the total weight of the composition.

11. The composition of claim 1, wherein the maleic anhydride and/or the acrylic acid is present in an amount of from about 0.5 wt % to about 6 wt %, based on the weight of the polypropylene that is functionalized therewith.

12. The composition of claim 1, wherein the polypropylene having at least one polar group is present in an amount of from about 0.5 wt % to about 5 wt %, based on the total weight of the composition.

13. The composition of claim 1, wherein the tackifier comprises at least one aliphatic hydrocarbon resin, at least one aromatic hydrocarbon resin, and at least one fatty acid ester compound.

14. The composition of claim 1, wherein the tackifier is present in an amount of from about 0.1 wt % to about 5 wt %, based on the total weight of the composition.

15. The composition of claim 1, wherein the ultra high melt flow polypropylene is present in an amount of from about 0.1 wt % to about 5 wt %, based on the total weight of the composition.

16. The composition of claim 1, wherein the filler comprises talc, mica, calcium carbonate, barite, kaolin, silica, glass, or any combination thereof.

17. The composition of claim 1, wherein the filler comprises calcium carbonate.

18. The composition of claim 1, wherein the filler is present in an amount of from about 50 wt % to about 90 wt %, based on the total weight of the composition.

19. The composition of claim 1, further comprising at least one additive comprising a pigment, flame retardant, thermal stabilizer, antimicrobial, biocide, light stabilizer, antistatic, or any combination thereof.

20. The composition of claim 1, wherein at least one component is a recycled material.

21. The composition of claim 20, wherein the recycled material comprises polyolefin, polyethylene, polypropylene, ethylene propylene, olefin copolymers, carpet comprising an olefin backing with nylon faced yarn, carpet comprising olefin backing with olefin faced yarn, glass beads, fly ash, gypsum or any combination thereof.

22. A flooring covering comprising the composition of claim 1.

23. The flooring covering of claim 22 comprising a single homogeneous layer, wherein the composition is in the form of multiple-colored and/or variable-sized chips, said chips being consolidated together.

24. The floor covering of claim 23, wherein the floor covering is in the form of a sheet, a tile or a plank.

25. The floor covering of claim 22, wherein the floor covering is in the form of a sheet, a tile or a plank.

26. A laminated surface covering comprising:
   i) a backing layer comprising the composition of claim 1, wherein the backing layer has a top surface and a bottom surface, ii) a décor layer having a top surface and a bottom surface, wherein the bottom surface of the décor layer is affixed to the top surface of the backing layer, and iii) at least one wear layer having a top surface and a bottom surface, wherein the bottom surface of the wear resistant layer is affixed to the top surface of the décor layer.

27. The laminated surface covering of claim 26, wherein the at least one wear layer comprises an unsaturated functional acrylate and aluminum oxide particles.

28. The laminated surface covering of claim 27, wherein the unsaturated functional acrylate comprises an epoxy oligomer, urethane oligomer, polyester oligomer, or any combination thereof.

29. The laminated surface covering of claim 26, wherein the at least one wear layer is directly on the top surface of the décor layer and is cured by electron beam or radiation.

30. The laminated surface covering of claim 26, wherein the décor layer comprises a gravure print, a digital print, a flexo print, a transfer print, a pad print, a stamping print, a decorative painting, or any combination thereof.

31. The laminated surface covering of claim 26, wherein the décor layer comprises a substrate, and wherein the substrate comprises a plastic film and/or paper.

32. The laminated surface covering of claim 31, wherein the plastic film comprises a non-poly vinyl chloride plastic film.

33. The laminated surface covering of claim 26, wherein the bottom surface of the décor layer is affixed to the top surface of the backing layer by primer/adhesive.

34. The laminated surface covering of claim 26, wherein the at least one wear layer comprises a flame retardant or a reactive monomer, wherein the reactive monomer comprises a mono-functional diluent, a di-functional diluent, a multi-functional diluent, or any combination thereof.

35. The laminated surface covering of claim 26, wherein the at least one wear layer comprises at least one surfactant, at least one defoaming agent, at least one abrasive resistant particle, or any combination thereof, and optionally at least one photoinitiator.

36. The laminated surface covering of claim 26, further comprising at least one additional layer, wherein the additional layer comprises an olefin blend, a glass mat, a thermoplastic film, or any combination thereof.

37. A method of making the composition of claim 1, comprising mixing components of the composition or extruding the composition in a twin screw, a single screw, a banbury mixer, an extruder with a slot die, or a continuous mixer, or any combination thereof.

38. The composition of claim 1, wherein said composition is halogen-free.

39. The floor covering comprising the composition of claim 38.

40. A laminated surface covering comprising:
   i) a backing layer comprising the composition of claim 38, wherein the backing layer has a top surface and a bottom surface,
   ii) a décor layer having a top surface and a bottom surface, wherein the bottom surface of the décor layer is affixed to the top surface of the backing layer, and
   iii) at least one wear layer having a top surface and a bottom surface, wherein the bottom surface of the wear resistant layer is affixed to the top surface of the décor layer.

41. The composition of claim 1, wherein said composition has a halogen content of from 0.0001 wt % to 30 wt % based on the weight of the composition.

42. The composition of claim 1, wherein said composition has a halogen content of from 0.01 wt % to 5 wt % based on the weight of the composition.

43. The composition of claim 1, wherein said composition has a halogen content of from 0.01 wt % to 1 wt % based on the weight of the composition.

44. A floor covering comprising the composition of claim 43.

* * * * *